(12) United States Patent
Rochelle et al.

(10) Patent No.: US 6,879,300 B2
(45) Date of Patent: Apr. 12, 2005

(54) WIRELESS BOUNDARY PROXIMITY DETERMINING AND ANIMAL CONTAINMENT SYSTEM AND METHOD

(75) Inventors: James M. Rochelle, Knoxville, TN (US); David M. Binkley, Charlotte, NC (US); Lloyd G. Clonts, Lenoir City, TN (US); Brian K. Swann, Seymour, TN (US); Rungwit Sangsingkeow, Knoxville, TN (US)

(73) Assignee: CMS Partners, Inc., Knoxville, TN (US)

( * ) Notice: Subject to any disclaimer, the term of this patent is extended or adjusted under 35 U.S.C. 154(b) by 340 days.

(21) Appl. No.: 09/779,076

(22) Filed: Feb. 7, 2001

(65) Prior Publication Data

US 2001/0030610 A1 Oct. 18, 2001

Related U.S. Application Data

(63) Continuation-in-part of application No. 09/499,948, filed on Feb. 8, 2000, now abandoned.
(60) Provisional application No. 60/181,098, filed on Feb. 8, 2000.

(51) Int. Cl.[7] .................. H01Q 21/24; G08B 23/00; A01K 15/04
(52) U.S. Cl. ............... 343/867; 340/573.3; 119/721
(58) Field of Search ................. 343/788, 742, 343/867; 340/572.7, 573.1, 573.3; 119/721

(56) References Cited

U.S. PATENT DOCUMENTS

| | | | |
|---|---|---|---|
| 29,610 A | 4/1860 | Minasy et al. | |
| 2,432,858 A | 12/1947 | Brown | |
| RE23,397 E | 8/1951 | Felch et al. | |
| 2,623,924 A | 12/1952 | Cartier et al. | |
| 2,927,734 A | 3/1960 | Vance | |
| 3,078,042 A | 2/1963 | Grado | |
| 3,103,663 A | 9/1963 | Parker | |
| 3,109,588 A | 11/1963 | Polhemus et al. | |
| 3,121,228 A | 2/1964 | Kalmus | |
| 3,133,283 A | 5/1964 | Ghose | |
| 3,187,169 A | 6/1965 | Trammell, Jr. et al. | |
| 3,354,459 A | 11/1967 | Schwartz et al. | |
| 3,430,243 A | 2/1969 | Evans | |
| 3,432,751 A | 3/1969 | Godby et al. | |
| 3,440,542 A | 4/1969 | Gautney | |
| 3,526,886 A | 9/1970 | Lubich | |
| 3,529,682 A | 9/1970 | Coyne et al. | |
| 3,560,977 A | 2/1971 | Cayzac | |
| 3,589,454 A | 6/1971 | Coyne | |
| 3,614,950 A | 10/1971 | Rabey | |
| 3,644,825 A | 2/1972 | Davis, Jr. et al. | |
| 3,656,161 A | 4/1972 | MacPherson | |
| 3,721,989 A | 3/1973 | Christensen | |
| 4,560,930 A | 12/1985 | Kouno | |
| 4,812,812 A | 3/1989 | Flowerdew et al. | |
| 5,425,367 A | 6/1995 | Shapiro et al. | |
| 5,460,124 A | 10/1995 | Grimsley et al. | |
| 5,661,459 A | 8/1997 | Belcher | |
| 6,392,547 B1 * | 5/2002 | Stewart et al. ........... 340/573.1 |
| 6,407,677 B1 * | 6/2002 | Avenel et al. .............. 343/867 |

* cited by examiner

*Primary Examiner*—Michael C. Wimer
(74) *Attorney, Agent, or Firm*—Pitts & Brittian, P.C.

(57) ABSTRACT

A proximity detection system for determining when a single channel receiver becomes proximate to any point on a wireless closed boundary continuously generated by a transmitter. The transmitter includes a magnetic field generator broadcasting a composite, modulated, time-varying magnetic field signal of a particular carrier frequency. The receiver forms a measure of the broadcast magnetic field intensity incident to the location of the receiver or a measure of the power or energy of incident field.

21 Claims, 17 Drawing Sheets

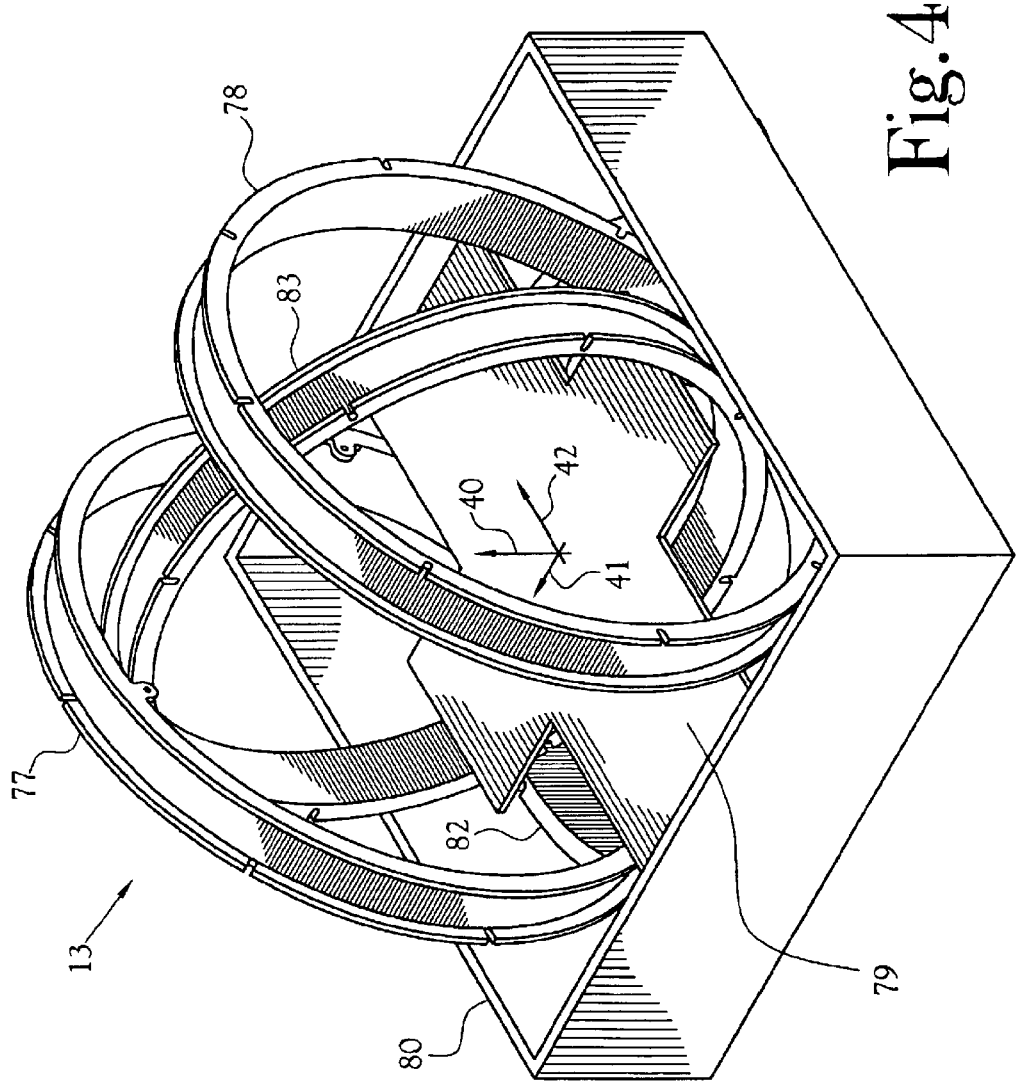

| | VALID DATA | | | | NOISY DATA | | | |
|---|---|---|---|---|---|---|---|---|
| | Y2S<Y1S | | Y2S≥Y1S | | Y2S<Y1S | | Y2S≥Y1S | |
| Power Freq (Hz) | 50 | 60 | 50 | 60 | 50 | 60 | 50 | 60 |
| NDIV | 327 | 273 | 325 | 271 | 329 | 275 | 329 | 275 |
| fs (HZ) | 99.6 | 119.1 | 100.8 | 120.9 | 100.2 | 120 | 100.2 | 120 |

WIRELESS BOUNDARY PROXIMITY DETERMINING AND ANIMAL CONTAINMENT SYSTEM AND METHOD

CROSS-REFERENCE TO RELATED APPLICATIONS

This application is a continuation-in-part of application Ser. No. 09/499,948, filed Feb. 8, 2000 now abandoned, and claims the benefit of U.S. Provisional Application No. 60/181,098, filed Feb. 8, 2000.

STATEMENT REGARDING FEDERALLY SPONSORED RESEARCH OR DEVELOPMENT

Not Applicable.

BACKGROUND OF THE INVENTION

1. Field of Invention

The invention relates to a method and apparatus for generating and sensing an electromagnetic field defining a wireless boundary. More specifically, this invention relates to a method and apparatus for determining the proximity of a receiver to an electromagnetic field boundary generated by a wireless transmitter, especially for animal containment.

2. Description of the Related Art

The present invention relates in general to proximity monitoring systems for determining when a second device (i.e., receiver module) is proximate to a first device, (i.e., transmitter), (which is the functional equivalent to determining when a second device is proximate to a wireless boundary encompassing and defined relative to the location of the first device) and is particularly directed to a high sensitivity, low cost proximity detection system which employs a modulated, quasi-static magnetic field and requires a small, very low cost and very low power second device as in a wireless pet containment application.

Proximity detection devices are used in a variety of applications for determining the relative nearness of an object, animal or person to a designated area or location or to the location of another object or person. One important area of application would be to determine if a child strays too far away from a certain location or from a parent or guardian. Another application would be to determine if an institutionalized individual or a tagged equipment item has strayed or been carried away from a designated area. Still another important area of application would relate to determining when a device is proximate to a kiosk for the purpose of establishing wireless communications only when the proximity is a prescribed distance. Still another important application would be for a pet containment system where a device worn by the pet must self-detect when it is proximate to a fixed wireless boundary.

Prior art methods for these types of proximity detection applications can generally be classified according to whether an implementation of the proximity detection method requires the second device (typically the portable, mobile device) to have both transmit and receive functionality or whether the method can be implemented with a receive-only second device. Examples in the prior art of systems requiring both transmit and receive functionality in the second device include those methods which rely on the transit time or phase shift properties of an ultrasonic or radio frequency signal. One major disadvantage of all such prior art methods is the relatively low battery life resulting from the relatively high power dissipated when the device is transmitting. Other major disadvantages are the relatively higher cost and larger size required for implementing transmit and receive functionality as compared to implementing a receive only device.

Proximity detection methods which can be implemented with a receive only second device can generally be sub-classified as systems which determine proximity by detecting the received signal strength of a propagating radio frequency signal (typically above a few hundred kHz) or systems which determine proximity by detecting the received signal strength of quasi-static, low-frequency (below 500 kHz and more typically below 100 kHz) magnetic field signal. The accuracy and repeatability of proximity detection based on radio frequency received signal strength is generally known in the prior art to be severely affected by multipath reflections from stationary or mobile reflecting surfaces and by field distortion variations caused by antenna proximity to conductors such as body tissue. Consequently these kinds of methods are not generally suitable for most proximity detection applications including wireless pet containment.

One prior art proximity monitoring system based on quasi-static magnetic fields is the wireless pet containment method of Weinberg which employs a stationary, unmodulated 1-axis magnetic field generator and a pet-worn receiver that requires a multiplicity of 1-axis sensing antennas and a corresponding multiplicity of single conversion receivers to form a measure of the incident magnetic field that is substantially independent of the receiver orientation. Major disadvantages of this method are the increased receiver circuit complexity, cost, size and battery current associated with the requirement for a multiplicity of sensors and receiver channels. Also, this method for detecting the signal strength of an unmodulated carrier cannot achieve very low noise bandwidths needed for maximum receiver sensitivity unless tightly matched and expensive oscillator crystals are used in both the signal generator and receiver. Another proximity monitoring system based on quasi-static magnetic fields is the child monitoring method of Belcher which employs a plurality of orthogonal magnetic fields modulated in a time sequential fashion using on-off amplitude keying at rates in excess of 1 kHz. This method also requires a multiplicity of receiver sensor antennas and a corresponding multiplicity of receivers to achieve an orientation-independent proximity detection performance. It therefore suffers the same disadvantages of increased complexity, size, battery current and cost. Also the relatively fast response time required to amplitude demodulate the on-off keyed carrier is not compatible with achieving the very low noise bandwidths needed to maximize receiver sensitivity.

There remains a need for a proximity monitoring and wireless pet containment system based on low-frequency magnetic fields and having minimum receiver size and cost in addition to maximum receiver sensitivity and battery life.

BRIEF SUMMARY OF THE INVENTION

The above discussed prior art problems and limitations are effectively remedied in the present invention of an improved system for determining when a receiver is proximate to a wireless boundary encompassing and defined with reference to the location of a transmitter. The present invention is based on near-field signal detection of the total power in a low-frequency (10 kHz to 100 kHz), quasi-static 3-axis magnetic field. Quasi-static magnetic fields are generally known to be immune to the field-strength variability problems that can occur in systems based on propagating RF fields because of multipath reflections and severe field distortion by proximate conducting masses such as body tissue. Operation in the near-field or quasi-static magnetic field zone is also generally known to be advantageous for wireless boundary proximity detection because the sharp inverse 6th power proportionality of the magnetic field power with distance allows for more accurate range thresholding decisions. The receiver module used to detect the magnetic field in the present invention is not required to transmit any signals and therefore can have lower cost and power, much longer battery life and simpler and more compact construction compared to prior art methods that require the portable device to transmit either an RF or ultrasonic signal. The receiver module in the present invention uses a novel single-output, two axis sensing antenna with orientation-independent response for detecting the total power in a 3-axis magnetic field signal. This provides for more accurate wireless boundary proximity detection performance compared to prior art methods using only a single-axis sensing antenna. The present invention receiver module achieves accurate, orientation-independent boundary detection using only one, non-multiplexed signal receiver circuit. This also allows for lower cost and power, longer battery life and simpler and more compact construction compared to prior art methods that can only achieve orientation-independent boundary detection through the use of a multiplicity of single-axis sensing antennas and a corresponding multiplicity of receiver circuits.

The present invention uses a composite magnetic field which is continuously broadcast and detected with no time-sequential multiplexing required for either the magnetic field signal generation, reception or detection. This allows for use of a magnetic field detection process incorporating coherent filtering to advantageously reject interference signals associated with the power line frequency of either 50 or 60 Hz. This allows the present invention to be much less susceptible to common sources of power line interference compared to prior art methods not incorporating rejection filtering of the power line frequency. In fact, coherent rejection filtering at the power line frequency is not possible for the prior art methods that require receiver antenna sequencing or multiplexing. The present invention uses continuous, coherent binary phase shift keying (BPSK) modulation signals to modulate a 3-axis magnetic field which is detected by a direct quadrature conversion receiver that translates the received signal directly into continuous, coherent quadrature I and Q baseband components. This method of carrier modulation and down conversion allows for a lower effective noise bandwidth in the post conversion filter compared to the noise bandwidths of several kilohertz exhibited by prior art methods based on magnetic fields modulated in a time sequential fashion using on-off amplitude keying or modulated using differential phase shift keying (DPSK) at rates in excess of 1 kHz. Additionally the use of BPSK modulation is generally known to have theoretically superior intrinsic signal to noise and bit error rate performance compared to DPSK. A lower receiver noise bandwidth is advantageous for achieving better signal-to-noise ratio for the magnetic field measurement resulting in more accurate and higher resolution boundary detection. The present invention uses digital signal processing of the sampled baseband signals to further improve the boundary detection accuracy compared to prior art methods that do not employ digital signal processing. Because the sigma delta modulators used for 9-bit (8 bits plus sign bit) signal digitization employ continuous time integration, the digital correlation filters used to process the baseband data samples have a theoretical performance equivalent to ideal matched filters for extracting the signals from random noise and for extracting the separately identifiable 3-axis magnetic field components from the composite received signal. Digital post processing is also used to advantage in the present invention for digitally combining the extracted measures of the 3-axis magnetic field components to form an orientation—independent digital measure of the total magnetic field power, and for additionally filtering the power measure with a digital moving average filter to achieve an overall receiver system noise bandwidth on the order of 2 Hz.

Compared to prior art methods, the present invention additionally provides means to detect when the magnetic field rapidly decreases due to a transmitter sudden failure or loss-of-power. In the case of a pet containment application, this prevents the pet from being shocked if the magnetic field transmitter is accidentally turned off or otherwise loses power. Compared to prior art methods, the present invention additionally provides means to detect when the received baseband signals are exceptionally noisy. In the case of a pet containment application, this feature is useful for preventing a high magnetic field noise level, such as that encountered near an automobile engine, from being erroneously interpreted as a valid magnetic field power signal. Without this feature a pet may run into the street near the front of an automobile and not receive a correction because the detection device has no facility for distinguishing between a high level of magnetic field noise and a bona fide containment zone magnetic field signal. The present invention transmitter integrates all the signal generation circuitry onto a CMOS integrated circuit chip and can therefore be lower cost and more compact compared to prior art methods that do not utilize a single chip for all signal generation circuits. Similarly, the present invention receiver module integrates the entire signal receiving circuitry onto a CMOS integrated circuit receiver chip and can therefore be lower cost and more compact compared to prior art methods that do not use a single integrated circuit receiver chip. The receiver module also integrates all the digital signal processing circuitry onto a digital CMOS integrated circuit chip and therefore typically has lower cost and more compact compared to prior art methods that do not integrate all digital functions onto a single chip or that implement the digital processing with a general purpose microprocessor chip.

The present invention generally pertains to a system for determining when a receiver module becomes proximate to any point on a wireless closed boundary, encompassing the position of the transmitter. The transmitter includes a magnetic field generator continuously broadcasting a composite, modulated, time-varying magnetic field signal of a particular carrier frequency and comprises a low-cost CMOS integrated circuit signal generation chip for generating optimally chosen carrier and modulation signals. The receiver module includes a totally passive, electrostatically-shielded, single output, two-axis magnetic field sensing antenna. The sensing antenna output signal is amplified and downconverted to baseband using an ultra-compact micropower direct conversion receiver circuit implemented on a low-cost CMOS integrated circuit receiver chip. The receiver module additionally includes a low-cost, micropower, CMOS digital integrated circuit chip for digitally processing the baseband signals with matched filters to obtain an accurate digital measure of the total power of the broadcast magnetic field incident on the receiver module. The CMOS digital chip also includes digital means for reliably determining when the total magnetic field power measure is above or below a predetermined threshold level and thereby means for determining when the receiver module location is proximate to the wireless closed boundary defined by points where the incident magnetic field power is of a value sufficient to cause the receiver module magnetic field power measure to be equal to the predetermined threshold level. The CMOS digital chip also has means for activating signaling devices as required to signal when the receiver module has crossed the wireless boundary.

The transmitter employs means for continuously broadcasting a 3-axis composite magnetic field having a single carrier frequency modulated using coherent binary phase shift keying (BPSK). The CMOS signal generation chip is provided with a master clock oscillator. Making the carrier frequency an integral multiple of the line power frequency is advantageous for enabling the signal detection process to have a high degree of rejection of interference from the power line frequency or any of its significant harmonics. A system clock frequency of 32,760 Hz also allows the use of simple integral ratio frequency division for the generation of modulation waveforms having fundamental frequencies which are integral sub-harmonics of the power line frequency. The 3-axis modulation signals are specifically chosen to facilitate a receiver module digital signal detection process which has a high degree of rejection of interference at the power line frequency or any of its significant harmonics and which allows accurate decomposition of the composite received signal into separately identifiable components corresponding to the separately identifiable signals broadcast from each transmitter antenna. To this end, a first modulation signal is a squarewave of fundamental frequency equal to ¼ the power line frequency and the second and third modulation signals are orthogonal squarewaves of fundamental frequency equal to ½ the power line frequency. Thus, each modulation signal exhibits zero cross-correlation with the power line frequency or any of its harmonics when cross-correlated over a full period of the first modulation signal. This property is advantageous for implementing device digital correlation filters that are highly effective for rejecting common sources of electromagnetic power line interference signals. Also, a correlation waveform having fundamental squarewave frequency of ¼ the power line frequency (like the transmitter first modulation signal) exhibits zero cross-correlation with the transmitter second and third modulation signals when correlated over a full cycle, irrespective of any particular phase relationship between the correlation waveform and the signals. This property is advantageous for implementing simple and robust digital means for phase locking the receiver module data acquisition clock with the transmitter modulation signals. The magnetic field is broadcast from the transmitter with a 3-axis orthogonal antenna arrangement implemented with a total of four coils, each of identical construction for cost-efficient manufacture. The coils are mounted in a 3-dimensional configuration which may be enclosable by the smallest possible housing in a symmetric arrangement that effectively excludes any magnetic field cross-coupling between the orthogonal antenna elements.

The sensor output signal is amplified and downconverted to baseband by an ultra-compact, micropower direct conversion receiver wherein the input RF preamplifier with optional AGC, master clock oscillator, PLL local oscillator synthesizer, dual I and Q mixers, dual I and Q baseband filters and dual sigma delta modulators are all integrated on a low-cost CMOS integrated circuit receiver chip. Most of the receiver circuit gain stages, including the input preamplifier, use micropower CMOS operational amplifiers having input stages formed from lateral PNP bipolar transistors which exhibit negligible flicker noise at frequencies above 1 kHz and lower input-referred input voltage offset relative to MOS transistors. The preamplifier AGC is useful for minimizing signal blocking caused by strong interfering signals that result in signal limiting at the preamplifier output and for minimizing increases in receiver supply current associated with large RF signals occurring in the receiver. The dual channel mixer uses a simple architecture involving two active op amps and four CMOS transmission gate switches achieving high isolation of local oscillator signals from the RF input. The receiver chip also includes a master clock oscillator using a 32,760 Hz crystal that needs to match the transmitter crystal to within about +/−200 ppm. A conventional PLL synthesizer with integral frequency division in the PLL loop and half-integer post divider is used to tune the receiver's local oscillator frequency to nominally the same as the carrier frequency of the broadcast magnetic field except mismatch between the first and receiver module 32,760 Hz crystals. This mismatch is accommodated by using quadrature I and Q downconversion and demodulation in the receiver. The baseband filter is a continuous time two-pole RC filter using off-chip capacitors to achieve a 300 Hz cut-off. A first baseband gain stage provides pin-programmable gains of 20 or 50 and a second gain stage with pin-programmable gains of 2,4,8, or 16. The baseline at the output of the first gain stage is restored with a continuous time restorer loop which achieves a 2 Hz low frequency bandwidth using a 0.47 $\mu$F off-chip capacitor. The I and Q baseband signals are integrated and quantized using dual continuous time sigma delta first order modulators which convert the integrated I and Q signals to density-of-pulses digital bit streams clocked out at the 32,760 Hz system clock rate and downsampled by digital up-down counters on the companion CMOS digital chip. The sigma delta modulators employ current-mode continuous time integrators such that digital downsampling of the modulator bit streams can result in data samples that represent the continuous time integration of the I and Q signals. This allows the use of simple, but highly accurate digital correlation methods in the companion digital chip that very closely emulates ideal continuous time matched filter correlation. The CMOS receiver chip also incorporates dual baseline crossing detectors for detecting every instance of baseline crossing of the I or Q baseband signals. These detectors comprise latchable comparators with deadtime control to produce countable pulse streams useful for qualifying the I and/or Q baseband signals as being exceptionally noisy and therefore representative of invalid data to be ignored by the boundary proximity detection logic in the companion CMOS digital integrated circuit chip. The micropower receiver chip operates reliably over a battery voltage range of 4.5 to 6.0 V and draws a total 5 V supply current of 74–91 $\mu$A for a tuning frequency range of 10–82 kHz.

The receiver module is provided with a low-cost digital CMOS integrated circuit chip for processing the I and Q sigma delta bit streams and baseline crossing countable pulse streams produced by the CMOS receiver chip. The digital circuit includes logic, memory, digital filter and digital arithmetic circuits for downsampling the sigma delta I and Q bit streams to produce signed 8-bit I and Q data sampled at a rate nominally equivalent to 2× the power line frequency. The sampling rate clock is obtained by integer division of the 32,760 Hz system clock where the division ratio is "dithered" to establish and maintain receiver module phase locking with the phase of the transmitter modulation signals. The digital chip also provides digital correlation of 8 successive I and Q sampled data sets to extract sets of sample measures of the separately identifiable portions of the I and Q received baseband signals resulting from the separately identifiable magnetic field intensity components broadcast by the transmitter first, second and third antennas. The 8-set correlations are clocked by a measurement rate clock which is the sampling clock divided by eight and therefore nominally ¼ the power line frequency. The correlations are done with a simple and compact digital addition or subtracting means whereby each I or Q data sample needs to be accumulated only once per measurement cycle. Although the correlations are done with simple digital means, the results match very closely with ideal continuous time correlation since the sigma delta modulators employ continuous time integrators and the reference waveforms for matched filter correlation are all symmetric, unit amplitude square waves such that correlation by adding or subtracting is exactly equivalent to continuous time correlation. In addition to providing nearly ideal matched filter extraction of the separately identifiable magnetic field component measures, the correlation filters also provide, near ideal rejection of power line interference components because the reference correlation waveforms are coherent and integral sub-harmonics of the power line frequency. Additionally, the correlation filtering process provides complete rejection of any dc components in the I and Q signal samples.

The digital chip also provides for post processing of the I and Q correlation results to obtain first, second and third power measures corresponding to those portions of the received signal power arising respectively from the separately identifiable magnetic field power components broadcast by the transmitter first, second and third antennas. These relative values of the computed power measures are dependent on the orientation of the sensing antenna relative to the direction vector of the incident magnetic field. Computing means is also provided for digitally summing the first, second and third power measures to obtain a digital measure of the total incident magnetic field power which is substantially independent of the orientation of the sensing antenna and therefore useful for accurate and robust wireless boundary proximity detection. The digital chip also provides post processing of certain correlation results to compute quadrature pseudo power variables that are measures of only that portion of the received signal power arising from magnetic field power components broadcast by the transmitter first antenna. Because of the cross-correlation properties previously discussed, these quadrature pseudo power measures exhibit very low sensitivity to power line frequency interference and also very low sensitivity to I and Q signal components corresponding the signals broadcast from the transmitter second and third antennas. These pseudo power measures, therefore, provide a very robust data-based means for dithering the sampling rate clock to achieve and maintain a prescribed phase lock between the phase of the digital chip measurement clock and the phasing of the magnetic field modulation signals. Because the correlation phase locking is based on the transmitter first modulation signal, it is important that the two-axis sensor antenna be arranged to have some non-zero response to the component of the magnetic field that is broadcast by the transmitter first antenna, at least during those times that the receiver module needs to be accurately monitoring proximity to the wireless boundary. This is arranged in pet containment applications, for example, by orienting the transmitter 3-axis broadcasting antenna such that the principal axis of the transmitter first antenna is in the horizontal plane and by mounting the receiver module sensing antenna on the pet such that its principal sensing plane is nominally horizontal when the pet is in an upright position from which it might walk or run toward the wireless boundary.

The digital chip also includes an 8-tap moving average digital filter for improving the signal to noise ratio associated with the total magnetic field power measure. The power measures are initially computed at a measurement rate of nominally ¼ the power line frequency or 15 samples per second for the case of 60 Hz power. Thus the averaged power measure from the moving average filter is totally refreshed every 0.533 seconds, and the effective noise bandwidth of the averaged data measurement is on the order of only 2 Hz.

The digital chip also includes logic for comparing the computed total power measure with a fixed preselected threshold to determine if the receiver module is proximate to the wireless boundary corresponding to said fixed threshold and whether the receiver module may be approaching the boundary from inside the boundary or from outside the boundary. Logic is also included for activating appropriate signaling device or devices when the receiver module is determined to be proximate to the boundary. In pet containment applications, the signaling devices would possibly include a beeper for emitting an audible warning beep, and means for applying high voltage pulses to electrodes designed to deliver a correction shock suitable for training the pet to avoid the wireless boundary. In applications such as pet containment where the receiver module is normally activated upon approaching the wireless boundary from the inside, a false alarm condition will occur if the magnetic field suddenly disappears due to a transmitter loss-of-power occurrence. This false alarm situation is prevented in the present invention by including means on the digital chip to detect an unusually rapid decrease in the value of the magnetic field total power measures. The digital chip also includes counters for counting the pulses from the receiver chip corresponding to baseline crossings of the I and Q baseband signals to determine if the I and Q data is too noisy to result in a valid total power measurement. Noisy data is flagged as invalid and is not used to drive the phase locking dithering loop and is not loaded into the total power measure moving average filter.

BRIEF DESCRIPTION OF THE SEVERAL VIEWS OF THE DRAWINGS

The above-mentioned features of the invention will become more clearly understood from the following detailed description of the invention read together with the drawings in which:

FIG. 4 is a perspective view of one embodiment of the orthogonal antenna arrangement;

DETAILED DESCRIPTION OF THE INVENTION

A wireless pet containment system generating an electromagnetic field defining a containment boundary for confining a pet wearing a stimulus module responsive to the electromagnetic field is illustrated generally at 9 in the figures. The wireless pet containment system determines when a second device (i.e., a receiver) becomes proximate to any point on a wireless closed boundary. The closed boundary encompasses the position of a first device (i.e., a transmitter). The transmitter includes a magnetic field generator broadcasting a composite, modulated, time-varying magnetic field signal of a particular carrier frequency. The wireless closed boundary is defined as the locus of all points at or near ground level on a path surrounding the transmitter for which the intensity of the magnetic field broadcast by the transmitter is a particular constant. The receiver includes at least one sensing antenna for producing at least one electrical signal in response to the incident magnetic field. The receiver sensing antenna output signal is amplified and downconverted to produce at least one or more baseband signals using at least one direct conversion receiver means. The receiver processes at least one of the baseband signals produced by the direct conversion receiver to form a measure of the broadcast magnetic field intensity incident to the location of the receiver or a measure of the power or energy of incident field. The receiver also determines when at least one of the measures is above or below a predetermined threshold level and produces an output signal when the receiver is respectively and correspondingly inside or outside the closed, wireless boundary. Increasing or decreasing the intensity of the composite magnetic field broadcast by the transmitter varies the expanse of the closed, wireless boundary.

Figure 1:
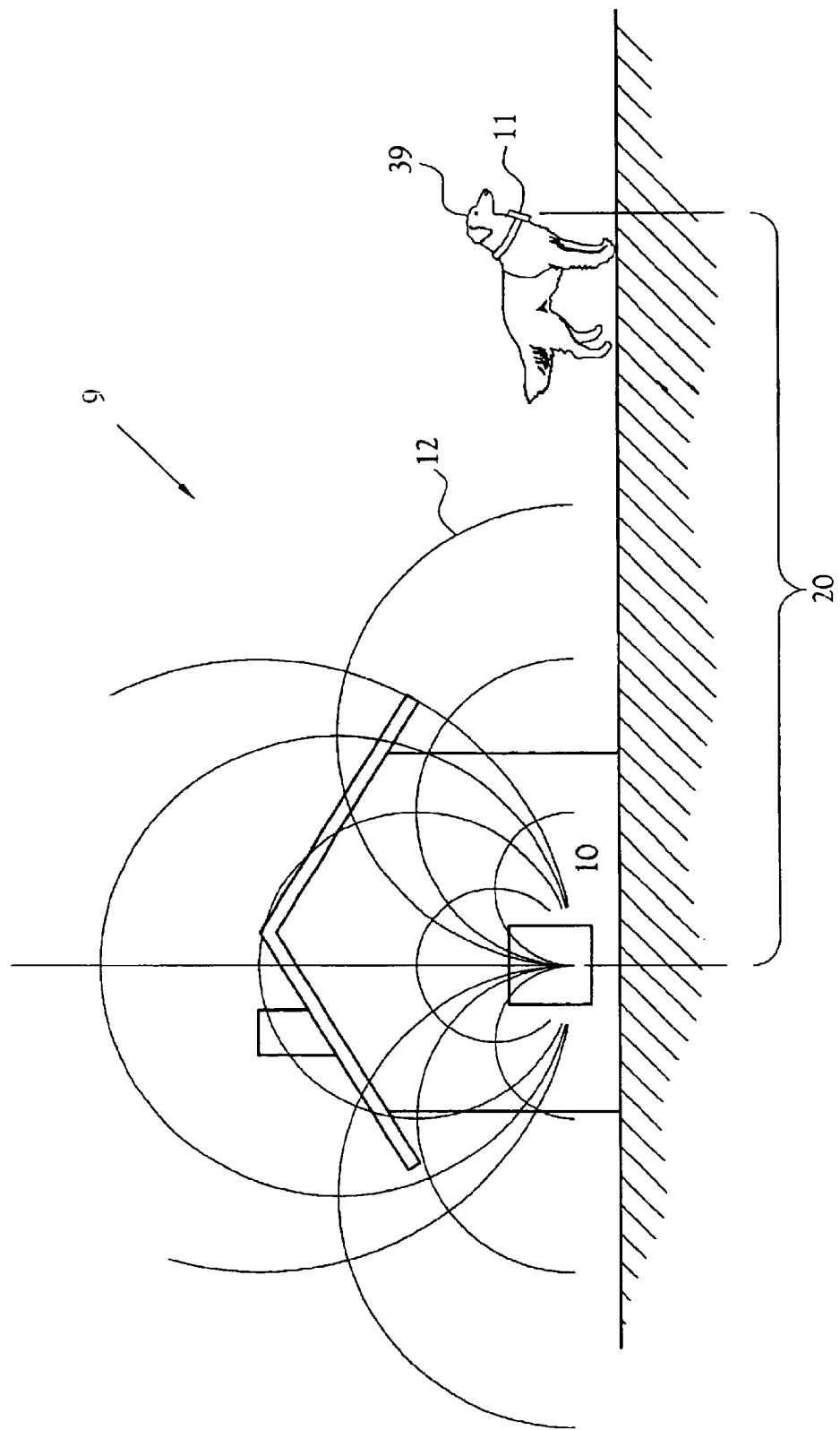
FIG. 1 generally illustrates the wireless pet containment system of the present invention.

FIG. 1 generally illustrates the wireless pet containment system 9 of the present invention. The illustrated embodiment includes a transmitter 10 acting to broadcast or transmit a composite time-varying magnetic field 12 that is incident upon a receiver, or stimulus, module 11, which is typically attached to an inanimate or animate object, such as a pet dog 39. The time-varying magnetic field 12 defines a wireless confinement boundary around the transmitter 10. The receiver module 11 receives and processes the incident magnetic field 12 to form a measure of the magnetic field average intensity or power. This measure of magnetic field power is used to determine proximity of the transmitter 10 in relation to the receiver module 11. When the distance between the transmitter 10 and the receiver module 11 reaches a predetermined distance 20, a response is generated. In the illustrated embodiment, the response is a deterrent stimulus that is applied to the pet 39.

Figure 2:
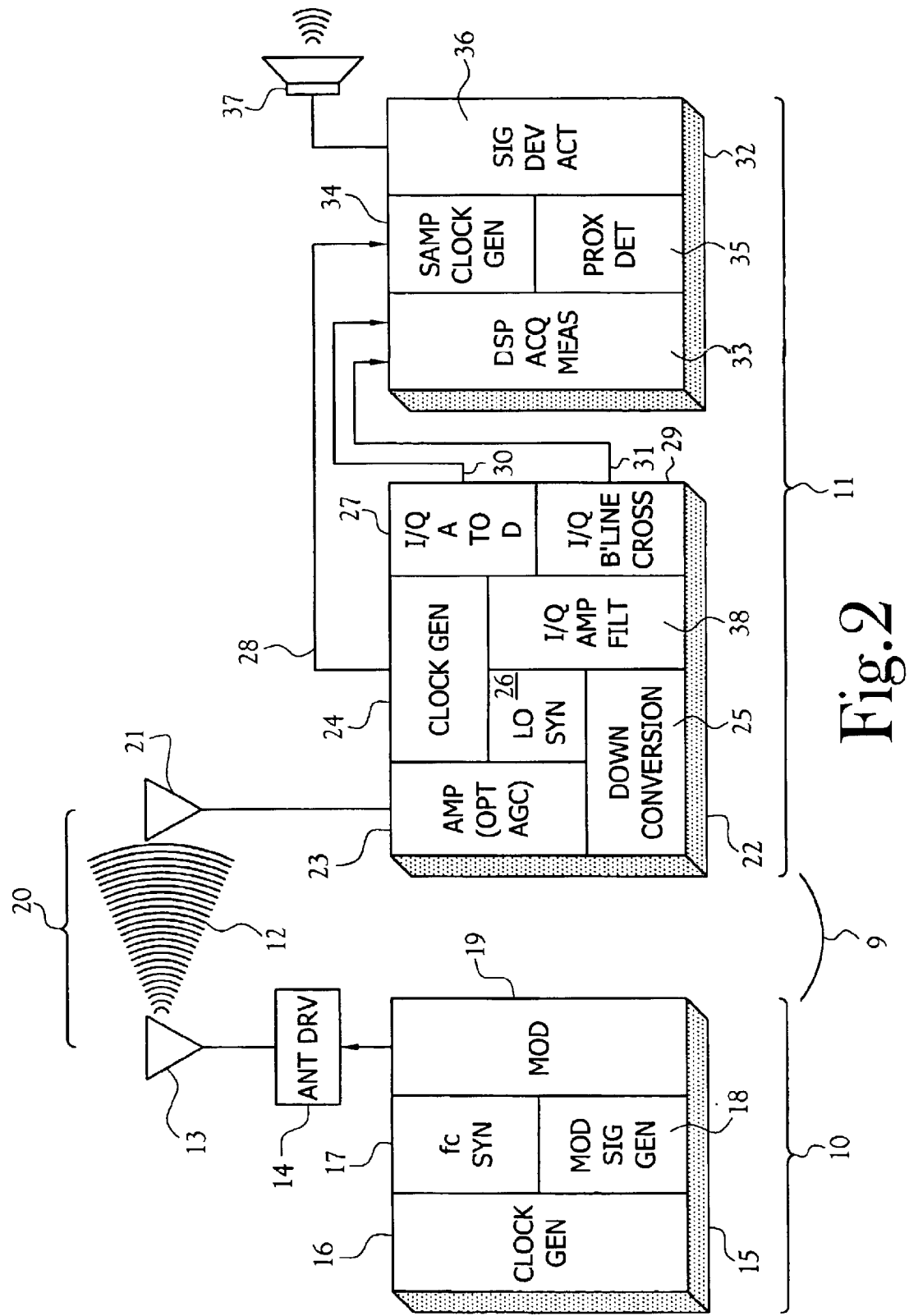
FIG. 2 is a block diagram of one embodiment of the wireless pet containment system.

One embodiment of the wireless pet containment system 9 is illustrated in FIG. 2. The wireless pet containment system 9 includes a transmitter 10 having an antenna arrangement 13 of one or more antenna coils for continuously broadcasting a composite time-varying magnetic field 12 corresponding to at least one signal applied to the antenna arrangement 13 by the antenna driver circuits 14. The antenna driver circuits 14 linearly amplify the signal or signals produced by a signal generator 15. In the illustrated embodiment, the signal generator 15 is a silicon complementary metal-oxide semiconductor (CMOS) integrated circuit (IC). The signal generator 15 of the illustrated embodiment includes all of the functions for generating the signals to be amplified and broadcast as the composite time varying magnetic field 12, including a transmitter clock generator 16, a carrier frequency synthesizer 17, a modulation signal generator 18, and at least one signal modulator 19. Those skilled in the art will recognize that the essential functions can be implemented in other ways, including, but not limited to, the use of discrete components. The clock generator 16 produces a master clock signal applied as the input clock to the carrier frequency synthesizer 17 and to the modulation signal generator 18. In the illustrated embodiment, the carrier frequency synthesizer 17 is digitally programmable to generate a coherent carrier signal, $f_c$, at a particular fundamental frequency suitable for broadcasting the composite magnetic field 12. The same carrier frequency is used to excite each transmitter antenna coil. One acceptable frequency range for the carrier signal is between 10 kHz and 100 kHz. Those skilled in the art will recognize that other frequencies can be used without departing from the scope and spirit of the present invention. In one embodiment, the transmitter carrier frequency, $f_c$, is selected to be an integral multiple of the frequency of the local line power, typically either 50 or 60 Hz. By using a multiple of the power line frequency, a high degree of rejection of interference from the power line frequency or any of its significant harmonics is achieved.

The modulation signal generator 18 of the illustrated embodiment produces a set of one or more separately identifiable waveforms suitable for modulating the carrier signal through the signal modulator 19 to produce a set of one or more separately identifiable modulated carrier signals to be amplified by the antenna drivers 14 and subsequently applied to drive a set of one or more separately identifiable antenna coils comprising the antenna arrangement 13. The set of separately identifiable modulation signals is designed to facilitate signal processing by the receiver module 11 for accurate and unambiguous extraction of a set of separately identifiable measures corresponding to the magnetic field components respectively associated with the set of separately identifiable signals continuously broadcast from the set of separately identifiable antenna coils.

Referring now to the receiver module 11 illustrated in FIG. 2, a sensing antenna arrangement 21 detects the composite time varying magnetic field 12 broadcast by the transmitter 10 and generates at least one electrical signal that is received by a receiver circuit 22. In the illustrated embodiment, the receiver circuit 22 is a silicon, mixed-signal CMOS integrated circuit. The illustrated mixed-signal receiver IC 22 includes all of the functions required to receive the signal from the sensing antenna arrangement 21 and downconvert the signals to recover the baseband composite modulation components of the received signal. The illustrated receiver IC 22 includes at least one antenna signal amplifier 23, a receiver clock generator 24 for producing suitable local oscillator (LO) signals, at least one down conversion circuit 25 for recovering the baseband signal from the amplified antenna signal and filtering and amplifier circuits 38 for amplification and final filtering of the baseband signal.

In the illustrated embodiment, the receiver IC 22 includes at least one analog-to-digital converter (ADC) 27 to produce digital samples of each of the baseband signals for subsequent digital signal processing operations. The illustrated receiver IC 22 includes an optional set of at least one baseline crossing detector 29 monitoring the set of at least one baseband signal and producing a single countable pulse for each instance of baseline crossing of the respective baseband signal. The baseband digital sample data streams 30 and the baseline crossing countable pulse streams 31 are optionally applied to a digital signal processor (DSP) 33 acting in concert with a sampling clock generator 34 to digitally process data streams 30, 31 for the purpose of extracting and computing an accurate digital measure of the average intensity, or power, of the incident magnetic field. The input clock signal 28 for the sampling clock generator is typically supplied from the receiver clock generator 24. The magnetic field digital measure produced by the DSP 33 is compared to a preselected digital threshold value using a proximity detection logic circuit 35 to determine if the magnetic field sample measure is less than or greater than a preselected threshold value. The threshold comparison results determine whether the receiver module 11 is located outside or inside a preselected wireless boundary encompassing the transmitter 10. A signaling device activation logic circuit 36 responds to the proximity detection results and produces signals as required to drive a signaling device 37 that generates a signal when the receive module 11 moves across the preselected wireless boundary. In the case of a pet containment application, the signaling device 37 is typically a stimulus delivery system that produces a deterrent stimulus when the pet 39 bearing the receiver module 11 crosses from inside to outside the wireless boundary. In this manner, the wireless pet containment system 9 trains the pet 39 to remain within the preselected, invisible, wireless boundary. Those skilled in the art will recognize that the DSP 33, the sampling clock generator 34, the proximity detection logic 35, and the signaling device activation logic 36 can be wholly or partially implemented in a number of different ways without departing from the scope and spirit of the present invention. For example, they can be wholly or partially implemented on the mixed-signal CMOS receiver IC 22, on a separate digital CMOS integrated circuit chip 32, or using discrete components.

Figure 3A:
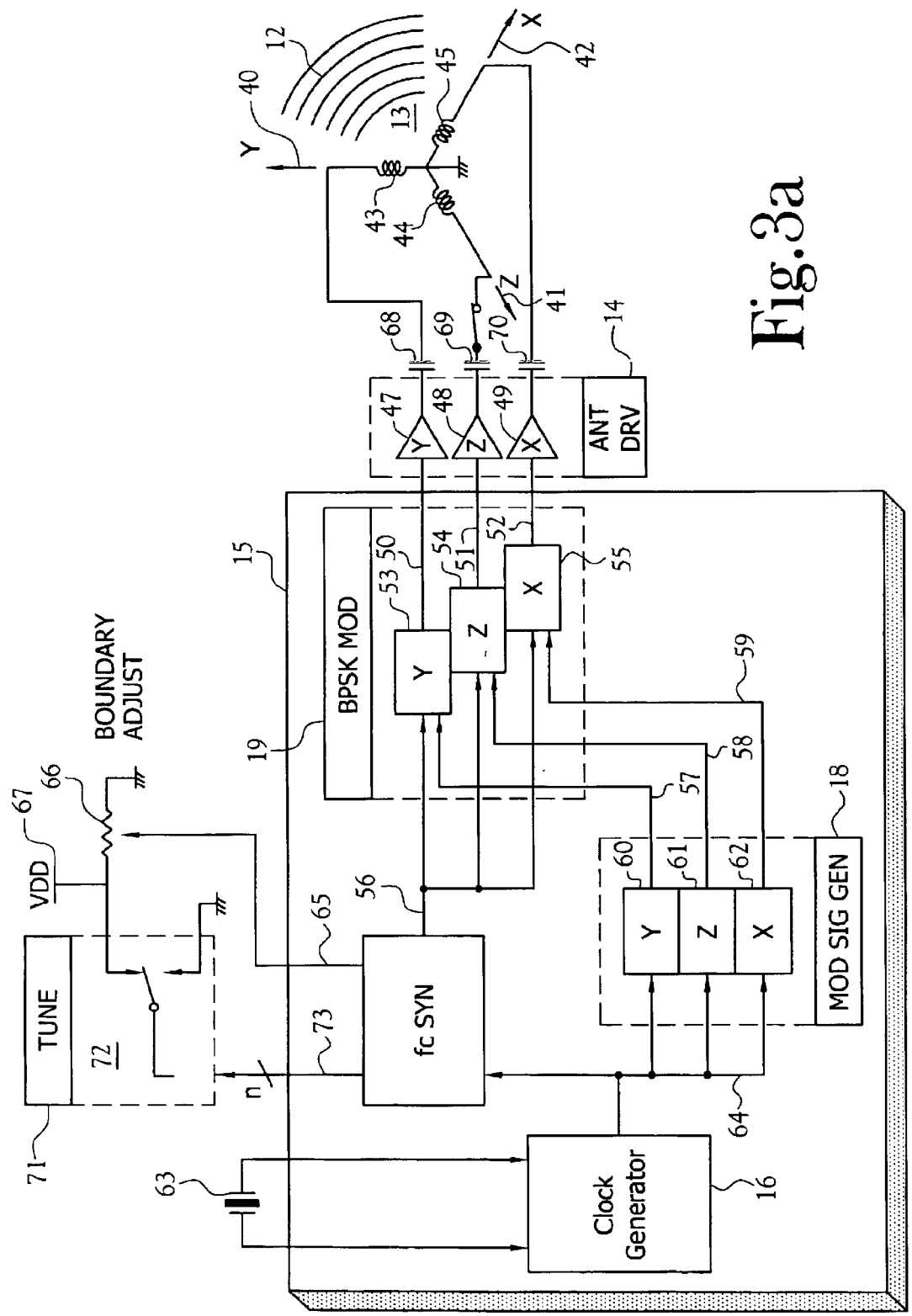
FIG. 3a is a block diagram of one embodiment of the transmitter.

FIG. 3a illustrates one embodiment of the transmitter 10 including a carrier signal generator 15 for the production of three separately identifiable carrier signals 50, 51, and 52, which are modulated using binary phase-shift keying (BPSK). Antenna drivers 47, 48 and 49, which continuously and simultaneously excite a 3-axis antenna arrangement 13, amplify the carrier signals 50, 51 and 52. The antenna arrangement 13 continuously broadcasts the time vary, composite magnetic field 12. The antenna arrangement 13 generally includes a geometrically orthogonal set of three separate antenna elements consisting of a first antenna 43 having a principal axis 40 and excited by the amplified version of a first BPSK modulated carrier signal 50, a second antenna 44 having a principal axis 41 and excited by the amplified version of a second BPSK modulated carrier signal 51 and a third antenna 45 having a principal axis 42 and excited by the amplified version of a third BPSK modulated carrier signal 52. The desired signal voltage amplitudes produced by the antenna drivers 47, 48 and 49 are boosted by exciting the antenna elements 43, 44 and in a conventional series resonant mode made possible by the use of resonating capacitors 68, 69 and 70. The three, separately identifiable BPSK modulated carrier signals 50, 51 and 52 are generated on the signal generator 15 by the BPSK modulator circuits 53, 54 and 55, which modulate a common carrier signal 56 with separately identifiable square wave modulation signals 57, 58, and 59. The modulation signals 57, 58 and 59 are digitally synthesized from a master clock signal 64 by the respective digital signal generation circuits 60, 61 and 62. The frequency synthesis circuit 17 which uses conventional phase locked loop methods for frequency control and includes an analog circuit for making the amplitude of the carrier frequency signal 56 vary in proportion to a reference voltage applied to an amplitude control input 65, synthesizes the carrier frequency signal 56 from the master clock signal 64. The carrier frequency 56 produced by the synthesis circuit 17 is tuned to a selected one of numerous possible carrier frequencies using an appropriate n-bit digital code applied to the digital frequency control input lines 73. The n-bit digital code controlling the carrier frequency selection is pin-programmed after the signal generator 15 is fabricated. In the illustrated embodiment, the control lines 73 of the signal generator 15 are connected to an off-chip array 71 of n connections 72 each of which can be set to a logical "one" or "zero" as desired. Because the carrier signals 50, 51 and 52 are all produced from the same carrier signal 56, the magnetic field power components simultaneously broadcast from each of the antenna elements 43, 44 and 45 are corporately and proportionately increased or decreased by connecting the amplitude control line 65 to an off-chip means for manually adjusting the voltage bias on the amplitude control line 65. Manual adjustability of the voltage applied to amplitude control input 65 is optionally provided for by connecting the control line 65 to an off-chip voltage divider circuit 66 consisting of a potentiometer connected to the power supply voltage 67 or to some other suitable bias voltage. The expanse 20 of the wireless boundary, defined by the locus of all points on a path surrounding the transmitter 10 for which the total power in the composite magnetic field is a constant, is thus increased by adjusting the voltage divider 66 to effect an increase in the amplitude of the carrier signal 56 and the expanse 20 is similarly decreased by adjusting the voltage divider 66 to effect a decrease in the amplitude of the carrier signal 56.

Figure 3B:
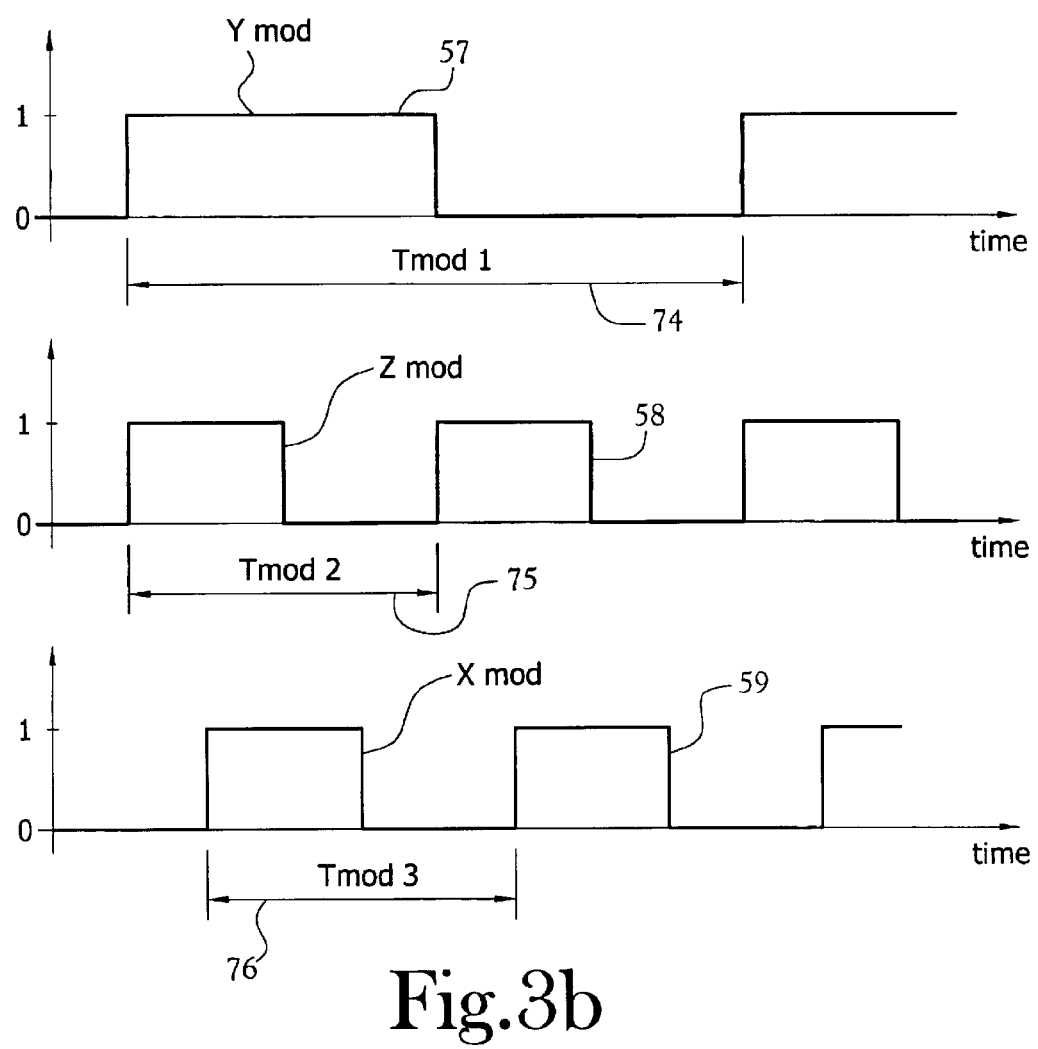
FIG. 3b is a set of waveforms of selected signals of the transmitter.

The master clock signal 64 is produced by a suitable clock generator 16, such as a CMOS oscillator circuit producing a master clock frequency corresponding to the mechanical resonant frequency of a common quartz crystal 63 located off-chip. The resonant frequency of the crystal 63 is chosen to be nominally 32,760 Hz, which is commonly available from many manufacturers in small packages at low cost because it can be manufactured as a slightly altered version of the standard 32,760 Hz "watch" crystal. Further, those skilled in the art will recognize that numerous possible carrier frequencies in the range of 10 kHz to 100 kHz that are integral multiples of the local line power frequency (typically either 50 or 60 Hz) are obtainable by applying conventional phase lock loop synthesis and half-integral-divisor digital frequency divider methods to the nominal 32,760 Hz master clock signals. By basing the carrier frequencies on the local power line frequency, the receiver signal processing circuits can reject extraneous signals generated by the local power lines. Additionally, the use of the nominal 32,760 Hz master clock frequency allows conventional integral-divisor digital frequency divider methods to produce fundamental modulator frequencies that are integral subharmonics of the power line frequency. The fundamental modular frequencies are useful for the efficient rejection by the receiver signal processing of any power line interference signals detected by the receiver sensing antenna 21. In one embodiment, illustrated in FIG. 3b, a first modulation signal 57 applied to the carrier signal of the transmitter first antenna 43 is a coherent digital squarewave 57 having a fundamental time period 74 which is a 4× multiple of the fundamental time period of the power line frequency such that the fundamental frequency of the first modulation signal 57 is equivalent to ¼ the fundamental frequency of the power line frequency. The second BPSK modulation signal 58 applied to the carrier signal of the transmitter second antenna 44 is in phase alignment with the first modulation signal 57 and is a coherent digital squarewave 58 having a fundamental time period 75 which is a 2× multiple of the fundamental time period of the power line frequency such that the fundamental frequency of the second modulation signal 58 is equivalent to ½ the fundamental frequency of the power line frequency. The third BPSK modulation signal 59 applied the carrier signal as applied to the transmitter third antenna 45 is also a coherent digital squarewave 59 which is in phase quadrature with the phase of the second modulation signal 58 and also has a fundamental time period 76 equal to the fundamental time period 75 of the second modulations signal 58 such that both modulation signals 58 and 59 have a fundamental frequency equivalent to ½ the fundamental frequency of the power line frequency.

With reference now to FIG. 4, one embodiment for the physical configuration of the transmitter 3-axis orthogonal antenna arrangement 12 is shown. In the illustrated embodiment, a total of four coils 77, 78, 82 and 83, which are of identical construction for cost-efficient manufacture, are used. The identical coils are mounted in a 3-dimensional configuration that is enclosed by the smallest possible housing 80. The largest inside dimension of the housing 80 is required to be no larger than the outside diameter of each of the said identical coils 77, 78, 82 and 83. This configuration is also effective to exclude any magnetic field cross coupling between the first, second and third antennas 43, 44 and 45. In the illustrated embodiment, the second antenna 44 is split into two coaxial coils 77 and 78, and each of the other two antennas 43 and 45 are implemented using a single coil 82 and 83, respectively. The coaxial coils 77 and 78 used for the second antenna 44 define a principal axis 41. In the illustrated embodiment the second antenna coils 77 and 78 are sufficiently spaced to allow the third antenna coil 83 to be fitted between them such that the third antenna principal axis 42 is aligned orthogonally with and intersecting with the second antenna principal axis 41. The arrangement of coils 83, 77 and 78 is received within the first antenna coil 82 such that the respective principal axes 40, 41 and 42 of the first, second and third antennas 43, 44 and 45 are all mutually orthogonal and intersecting. A printed circuit board 79, which incorporates the signal generator 15 and the associated components 63, 66, 67 and 71, the antenna drivers 47, 48 and 49 and the resonating capacitors 68, 69 and 70 is mounted within the antenna arrangement 13. Because the coaxial coils 77 and 78 are connected in electrical parallel or electrical series to realize the second antenna 44, the second antenna 46 will typically have greater or less circuit inductance than the antennas that use only one coil. Accordingly, the use of a resonating capacitor 68 having capacitance value respectively smaller or larger compared to the value of capacitors 69 and 70 is necessary to resonate the second antenna 44 with the antennas implemented with only a single coil 82 and 83.

In the illustrated embodiment the operating orientations for the transmitter antenna arrangement 13 are with the second axis 41 deployed vertically such that the first antenna 43 which is excited with first modulation signal 57 is always oriented with corresponding first axis 40 located in a horizontal plane. Those skilled in the art will recognize that the third axis 42 can be deployed vertically with a similar effect.

Figure 5A:
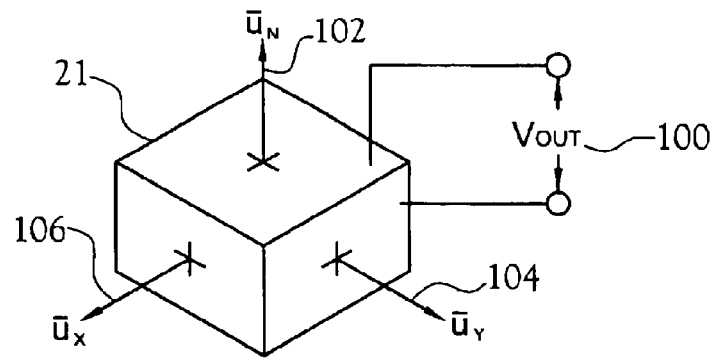
FIG. 5a is a perspective view of the geometric axes of the sensing antenna.
Figure 5B:
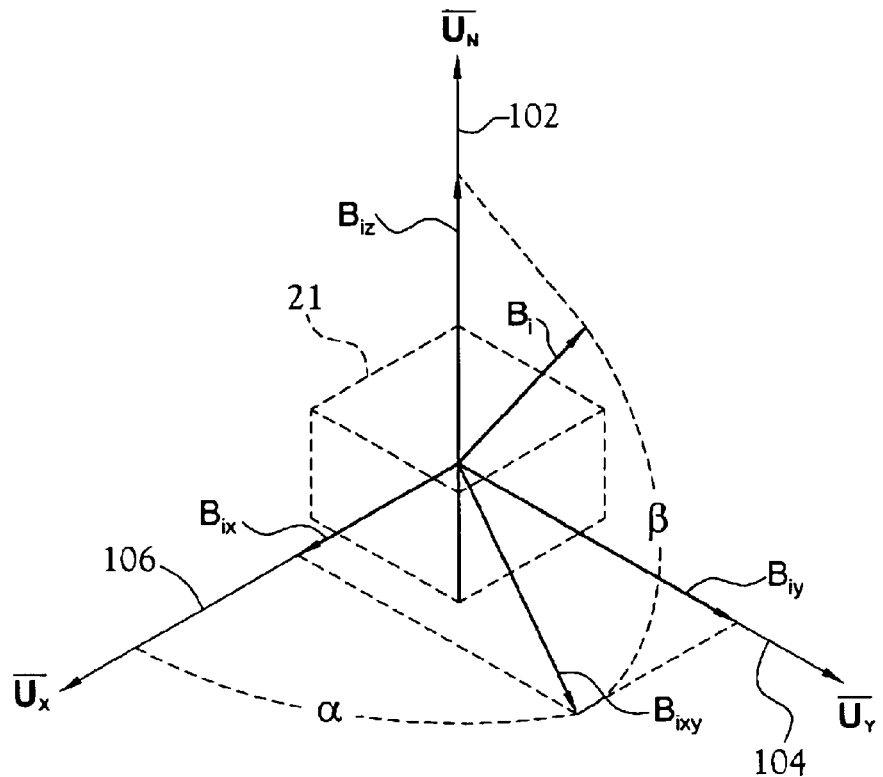
FIG. 5b is a vector diagram of the magnetic field vectors incident on the sensing antenna.

With reference to collective FIG. 5, the illustrated receiver module 11 includes a totally passive, two-axis magnetic field sensing antenna 21 producing a single electrical output signal 100 which is a proportional measure of the amplitude of $B_{rxy}$, the projection of the incident magnetic field vector, $B_r$, onto the antenna's sensitive plane defined as the plane which includes the direction vectors 102, 104 and 106 and where the output signal 100 is invariant as the antenna 21 is rotated about its normal axis 102, said normal axis being orthogonal to the antenna's sensing plane.

Figure 6:
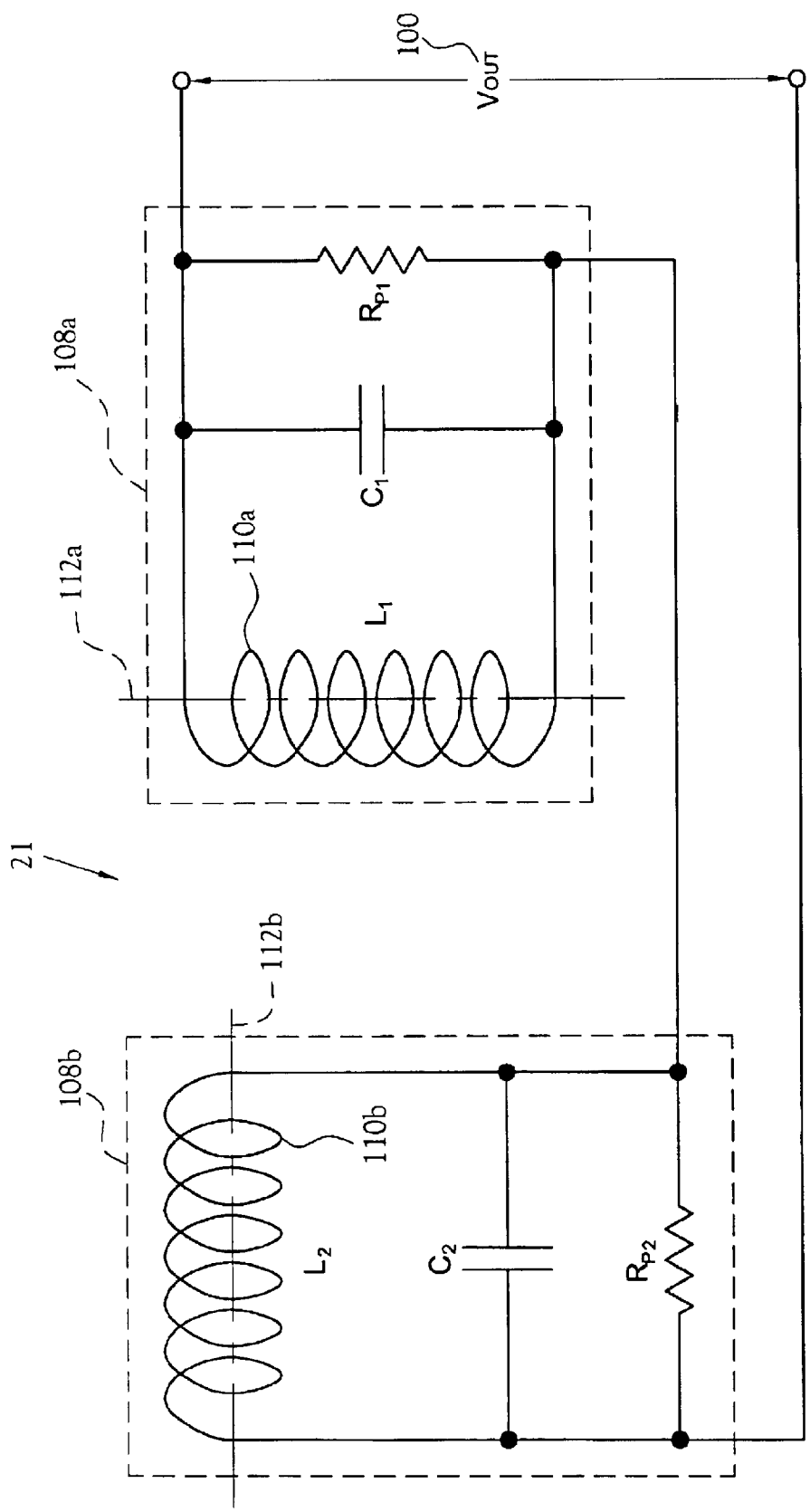
FIG. 6 is a schematic diagram of the sensing antenna showing the orientation of the two sensing elements.

Turning now to FIG. 6, the two-axis, single output magnetic field sensing antenna 21 includes two single-axis sensing elements 108a and 108b configured such that (a) the elements 108 have the same sensing axis amplitude response with said amplitude response being proportional to the projection of the magnetic field direction vector onto the respective sensing axis 12a and 112b of each element, (b) the transduction responses of the elements 108 to a magnetic field of carrier frequency, $f_c$, have equal scaling factors and a time domain phase difference of 90°, (c) the elements 108 are mounted such that the sensing axes 112 are geometrically orthogonal and act to define the antenna's sensing plane, (d) the elements 108 are mounted such that the element 108a is not responsive to the local parasitic magnetic field produced by signal current flowing in the element 108b and vice versa, and (e) the single electrical output signal 100 is produced by the series electrical connection of the output signals produced individually by the elements 108a and 108b. Each element 108 is made sensitive to the incident time varying magnetic field by the incorporation of an inductor 110. The inductors 110 are configured as a series electrical connection of one or more turns, or loops, with the principal axes of all turns being co-linear and defining the sensing axes 112. The coil windings forming the inductors 110 are directly wound around a bobbin-shaped ferrite magnetic core material having a small loss tangent at the signal carrier frequency, $f_c$. Those skilled in the art will recognize that the two-axis, single output antenna 21 can also be realized with other inductor core configurations including a simple air-core design. As shown in FIG. 6, inductors 110a ($L_1$) and 110b ($L_2$) are connected in parallel with capacitors $C_1$ and $C_2$ respectively forming separate parallel resonant circuits wherein resistors $R_{p1}$ and $R_{p2}$ also respectively appearing in parallel act to define the electrical response Q-factors of the parallel resonant circuits. Inductance values, $L_1$ and $L_2$, and capacitance values, $C_1$ and $C_2$ are chosen such that the elements 108a and 108b have resonant frequencies of $f_{r1}$, and $f_{r2}$, respectively, such that $f_{r1}<f_c$ and $f_{r2}>f_c$. This produces transduction responses in the inductors 110a and 110b having equal amplitude scaling and 90° time phase difference. In one embodiment, the capacitors are chosen from capacitors of standard value and the inductors 110a and 110b are selected to have equal inductance values for ($L=L_1=L_2$), such that capacitors $C_1$ and $C_2$ have an average value according to $$C_{avg} = \frac{1}{(2\pi f)^2(L)} \quad (1)$$

and a difference ($C_1-C_2$) to produce a desired average resonance Q-factor defined by the relationship $$(C_1 - C_2) = \frac{2C_{avg}}{Q_{avg}} \quad (2)$$

where $Q_{avg}$ is the average of the Q-factors for the elements 108 evaluated at the signal carrier frequency, $f_c$. The average Q-factor is also achieved by making the total effective parallel resistance $R_p$ for the elements 108 to have a value of $$R_{p1} = R_{p2} = R_p = \frac{Q_{avg}}{(2\pi f)C_{avg}} \quad (3)$$

This total resistance accounts for the total resonant circuit losses, including inductor losses, for both winding and core, plus losses in any parallel resistance or loading added to control the Q-factor. Thus, the required $R_p$ value is actually the parallel combination of the parallel-equivalent inductor losses and the discrete resistance added as required to realize the required total $R_p$.

Figure 7A:
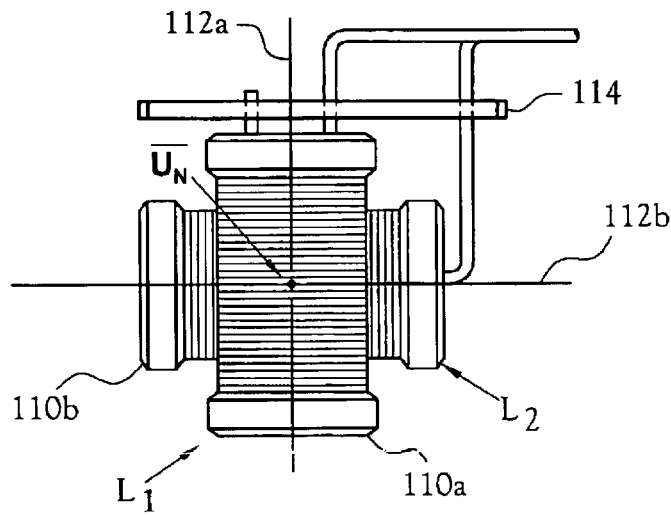
FIG. 7a is a front elevation view of the sensing element and circuit board.
Figure 7B:
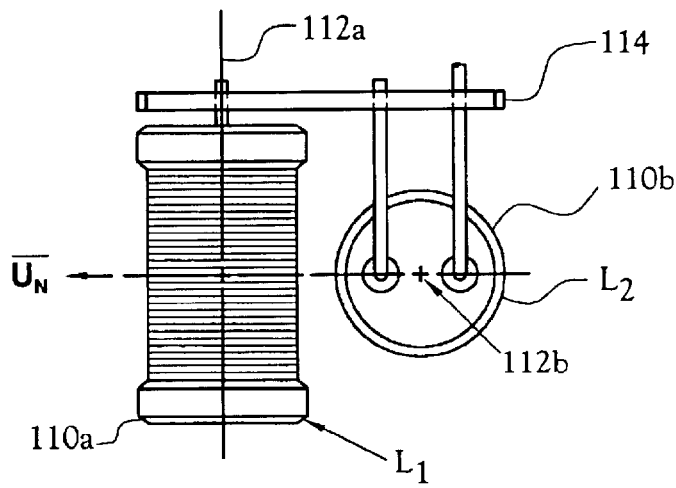
FIG. 7b is a right side view of the sensing element and circuit board.
Figure 7C:
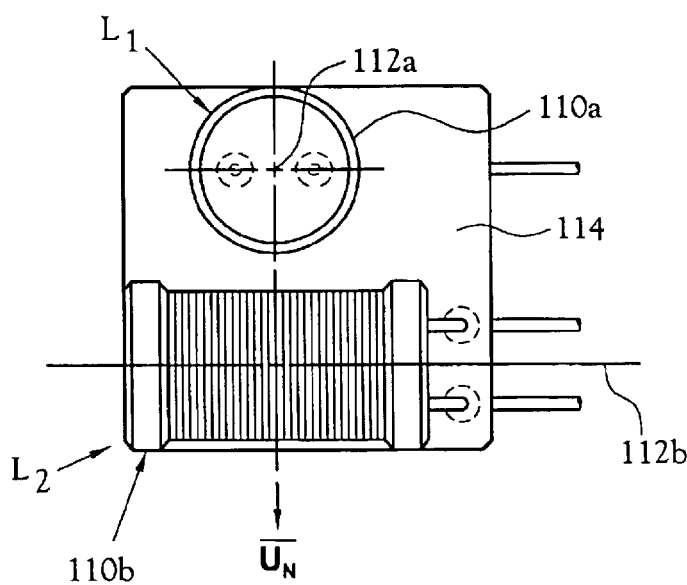
FIG. 7c is a bottom plan view of the sensing element and circuit board.

With reference now to collective FIG. 7, the one structure for the inductors 110 is revealed by the front elevation view of FIG. 7a, the right side view of FIG. 7b and the bottom plan view of FIG. 7c. The $L_1$ sensitive axis 112a is orthogonal to the $L_2$ sensitive axis 112b. The inductors 110a and 110b are aligned so that a line passes through the geometrical and electromagnetic center of each inductor 110 to form the antenna's normal axis 102 such that the line defining the normal axis 102 is orthogonal to the sensitive axes 112 of both inductors 110. Because of symmetry, the mutual inductance between the inductors 110 is eliminated, and any ferrite proximity effect is the same for both inductors 110 and is typically on the order of a few percent. The inductors 110 and the associated parallel capacitors and resistors are mounted and interconnected via a printed circuit board 114, as illustrated in collective FIG. 7. The capacitors and resistors are implemented as surface mount components for the most compact assembly.

Figure 8A:
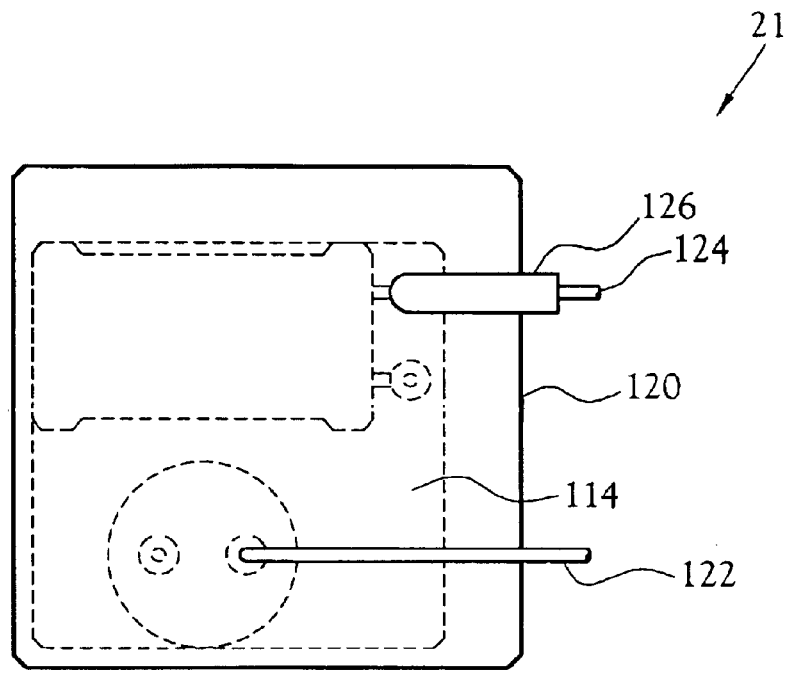
FIG. 8a is a top plan view of the sensing element and circuit board showing one embodiment of electrostatic shielding.
Figure 8B:
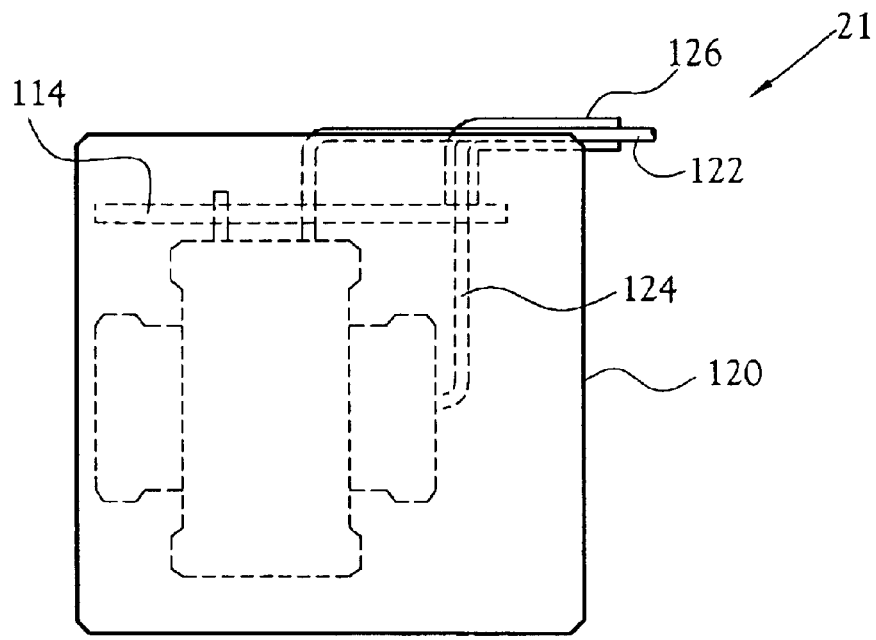
FIG. 8b is a front elevation view of the sensing element and circuit board showing one embodiment of electrostatic shielding.

With reference now to collective FIG. 8, one method of electrostatically shielding the antenna 21 is revealed in the top plan view of FIG. 8a and the front elevation view of FIG. 8b. The shield 120 is a partially conductive layer completely surrounding the antenna 21. The sheet resistivity of the partially conducting layer 120 is chosen to selectively attenuate the incident electric field relative to the incident magnetic field. The sheet resistivity is approximately in the range of tens of ohms per square for sensing magnetic field carrier frequencies in the commonly used range of 10 kHz to 100 kHz. In the illustrated embodiment, the shield 120 completely encloses the antenna 21 and is electrically isolated from all parts of the antenna 21 except for the antenna output signal conductor, which is considered to be the low-impedance or ground side connection 122 of the output signal 100. This is accomplished by encapsulating the antenna 21 in a non-conductive epoxy and applying an appropriate coating to the exterior of the epoxy to realize the desired shield 120. The high impedance conductor 124 of the output signal 100 is suitably insulated from the partially conductive coating by a non-conductive sleeve 126. The material used to realize the partially conductive selective shield coating is one of the several graphite-based formulations commercially available as a quick-drying aerosol for spray application or as a colloidal suspension for dipping or brush application. Those skilled in the art will recognize that other coatings may be used for shielding without departing from the spirit and scope of the present invention.

FIG. 9 illustrates one embodiment of the receiver module 11. The receiver module includes a CMOS direct conversion integrated circuit receiver as shown in FIG. 9a, an optional AGC loop as shown in FIG. 9b, a PLL local oscillator synthesis circuit as shown in FIG. 9c, switching mixer circuits for downconversion as shown in FIG. 9d, baseband gain and filtering circuits as shown in FIG. 9e, and first order sigma delta modulator circuits as shown in FIG. 9f. All the essential functions required for implementing a micropower direct conversion receiver circuit for processing the BPSK modulated RF output signal 100 produced by a single output, 2-axis magnetic field sensing antenna 21 are implemented on a silicon, mixed-signal CMOS integrated circuit receiver chip 22, in the illustrated embodiment. The receiver chip 22 includes a micropower preamplifier circuit 23 for receiving the antenna output signal 100 and providing a voltage gain of typically 100 over a bandwidth of 1.5 kHz to 90 kHz and drawing less than 10 $\mu$A average continuous current from a battery power source 204. The preamplifier circuit 23 is implemented with an all CMOS transistor design except for the input stage is implemented from the parasitic lateral PNP bipolar transistors available in any n-well, bulk CMOS integrated circuit process. The use of lateral PNP bipolar transistors for the preamplifier input stage minimizes signal-to-noise degradation due to flicker noise in the RF signal frequency region of interest from 10 kHz to 100 kHz. The preamplifier input bias current is selected to be less than 50 nA in order to minimize the signal-to-noise degradation due to shot noise associated with the input base current of the input bipolar transistor. The preamplifier is implemented with analog CMOS gain circuits using differential circuit means to achieve power supply rejection as required to avoid gain variations due to normal changes in the battery power supply voltage over the useful life of the battery 204.

Figure 9A:
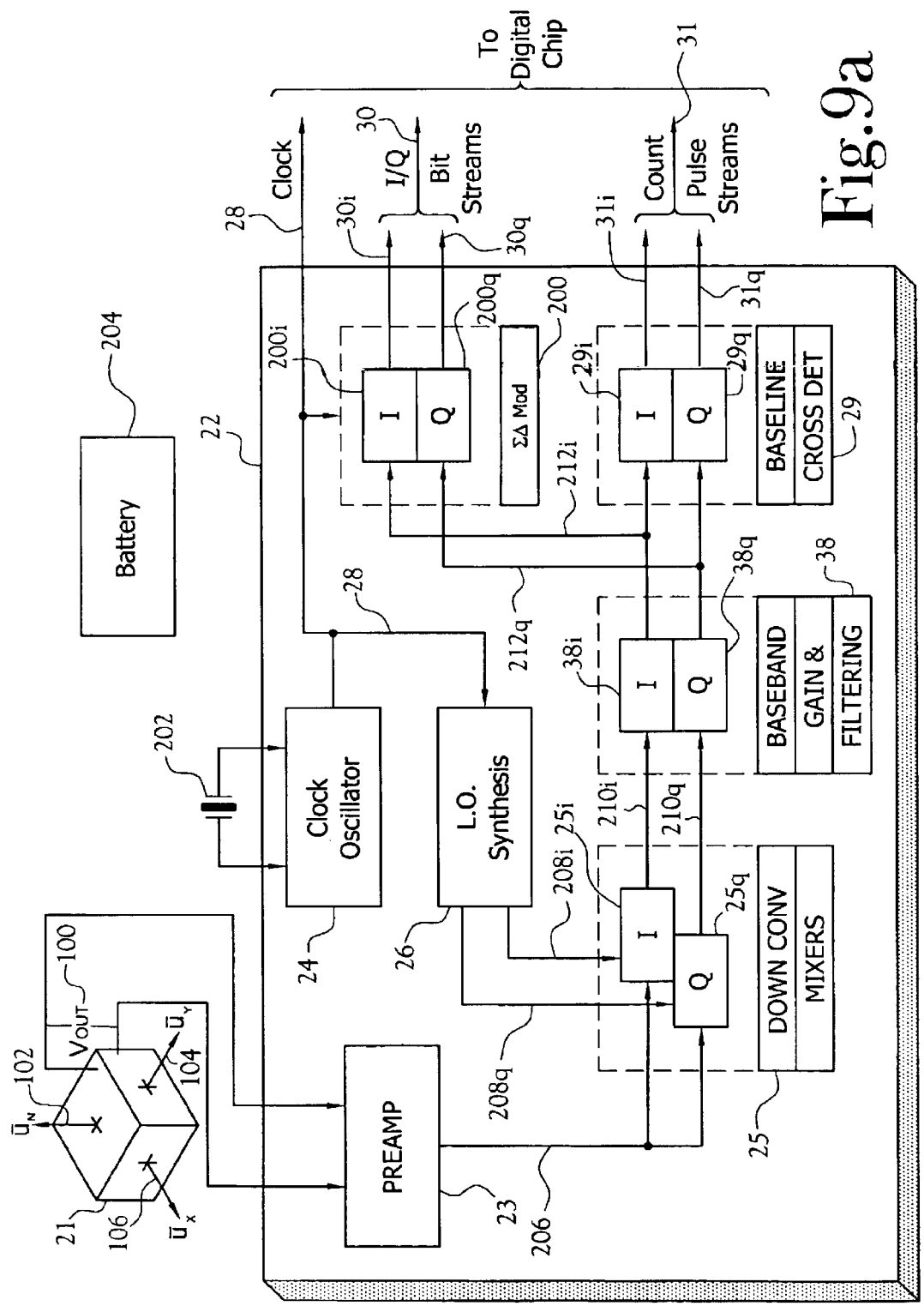
FIG. 9a is a block diagram of the receiver circuit of the receiver module.
Figure 9B:
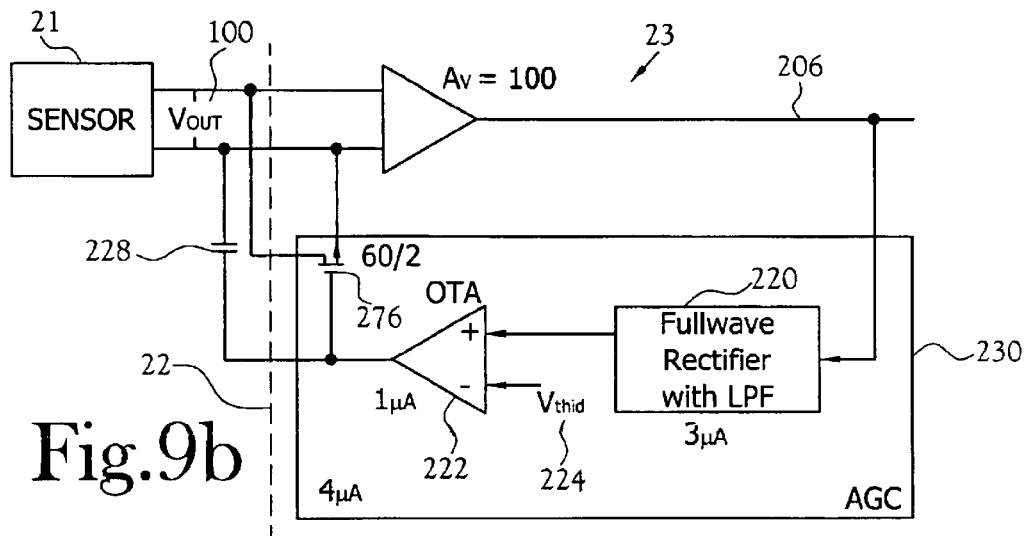
FIG. 9b is a block diagram of an optional AGC preamplifier circuit for the receiver module.

In the illustrated embodiment, the preamplifier 23 includes an AGC loop 230 as shown in FIG. 9b for the purpose of maintaining linear preamplifier response in the presence of large overload signals. The illustrated AGC loop 230 includes a full-wave rectifier circuit 220 to rectify the bipolar preamplifier signal 206 and a differential input operational transconductance amplifier (OTA) 222 for comparing the output of the full-wave rectifier 220 to a fixed reference voltage 224 and driving the gate of Negative-Channel Metal Oxide Semiconductor (NMOS) transistor 226 connected in parallel with the sensing antenna output signal 100. In normal low-signal operation, the output of the full wave rectifier 220 is smaller than the reference voltage 224 causing the OTA. 222 to drive the gate of the NMOS transistor 226 negative such that the NMOS transistor 226 is in an "off" state and has no effect on the sensing antenna output 100. When the preamplifier output signal 206 is increased to a level where the output of the full-wave rectifier 220 is comparable to the reference voltage 224, the OTA output biases the gate of transistor 226 such that the transistor's channel conducts, thereby shunting enough antenna signal 100 away from the preamplifier input to dynamically maintain the preamplifier output signal 206 at a linear region level corresponding to zero error voltage at the input of the OTA 222. The AGC loop response is controlled by the off-chip loop filter capacitor 228. The AGC loop 230 is disabled by replacing the loop filter capacitor 228 with a short circuit such that the NMOS transistor 226 is maintained in a cut-off state at all times. The AGC loop 230 utilizes analog CMOS micropower circuits requiring a total battery current of only 4 µA and incorporating differential circuit methods to achieve power supply rejection as required to avoid loop gain variations due to normal changes in the battery power supply voltage over the useful life of the battery 204.

The master clock signal 28 for the receiver chip 22 is produced by a suitable CMOS clock oscillator circuit 24 acting to produce a master clock frequency corresponding to the mechanical resonant frequency of a common quartz crystal 202 located off-chip. The resonant frequency of the receiver module crystal 202 is chosen to be nominally 32,760 Hz. In the illustrated embodiment, the receiver module crystal 202 is of the same type and manufacture as the transmitter oscillator crystal 63 so that the transmitter and receiver module master clock frequencies are matched to within +/−200 ppm. As with the transmitter 10, a receiver module master clock frequency of nominally 32,760 Hz allows conventional phase lock loop synthesis and half-integral-divisor digital frequency divider methods to produce numerous possible carrier frequencies in the range of 10 kHz and 100 kHz which are integral multiples of the local line power frequency. The clock oscillator circuit 24 utilizes analog CMOS micropower circuits requiring a total battery current of only 1 µA and is designed to provide a clock output signal 28 having a controlled duty cycle of 50% +/−2% for accurate control of the conversion gain of the sigma delta modulators 13.

Figure 9C:
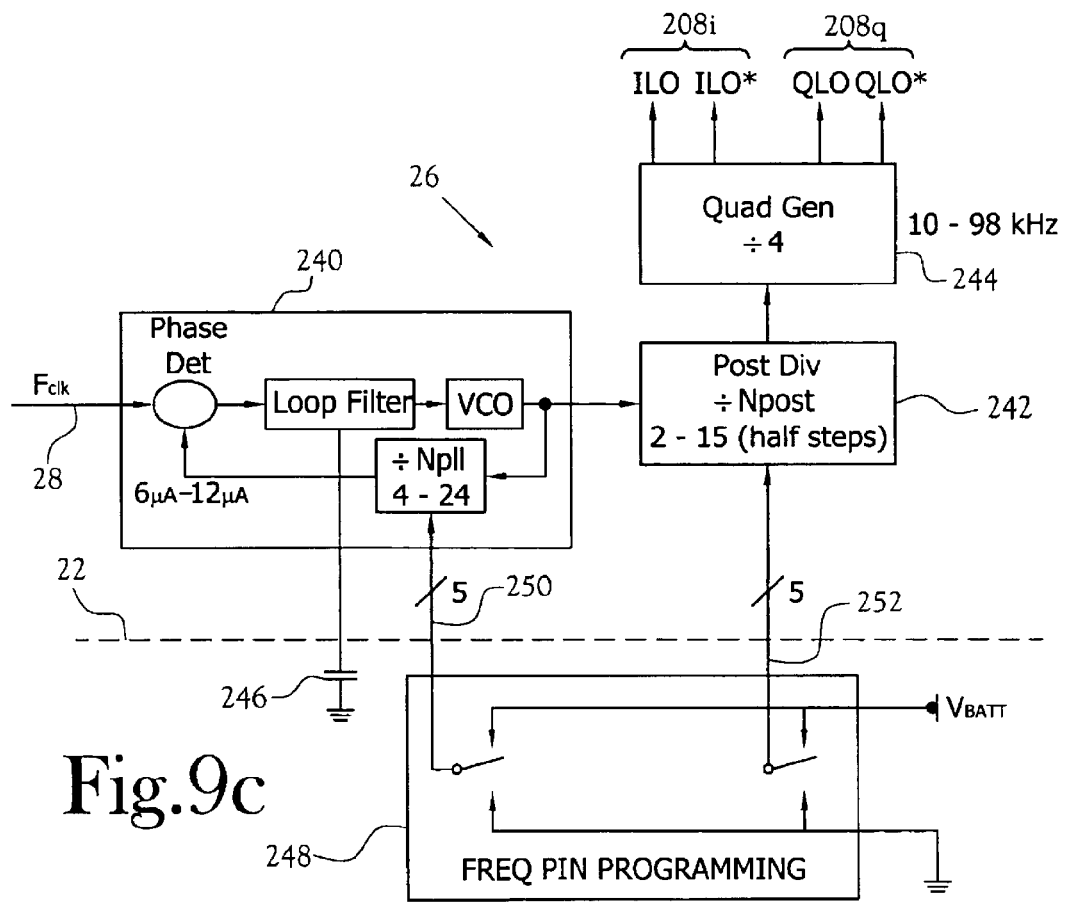
FIG. 9c is a block diagram of a local oscillator synthesis circuit.

The master clock frequency 28 of nominally 32,760 Hz is translated to the local oscillator, LO, frequency required for tuning the direct conversion receiver to receive the carrier frequency of the composite magnetic field broadcast by a local oscillator synthesis circuit 26 shown in FIG. 9c. A micropower phase locked loop 240 is used to translate the master clock frequency, $f_{CLK}$, up to a frequency $f_{PLL}=(f_{CLK})\cdot(N_{PLL})$, where $N_{PLL}$ is the frequency division divisor of the PLL loop divider. The PLL output frequency is translated down to the required $f_{LO}$ frequency by a half-integer post divider and an additional ÷4 frequency divider incorporated in the quadrature generator circuit 244. The resulting $f_{LO}$ clock frequency is $f_{LO}==(f_{CLK})\cdot(N_{PLL})\div(N_{POST})\div4$, where $N_{POST}$ is the post divider frequency divide ratio. In one embodiment, $N_{POST}$ is a half-integer. The quadrature generator 244 provides differential $f_{LO}$ clock lines 208$i$ for clocking the I downconverter 25$i$ and differential $f_{LO}$ clock lines 208$q$ for clocking the Q downconverter 25$q$. The 208$i$ LO clocks are generated in quadrature with the 208$q$ LO clocks. The PLL loop filter capacitor 246 is optionally located off-chip. Also, the 5-bit digital code 250 for selecting $N_{PLL}$ and the 5-bit digital code 252 for selecting $N_{POST}$ are optionally moved off-chip to allow the receiver to be digitally tuned by a set of off-chip jumpers or switches 248 allowing pin programming of the required divider codes.

The LO clock generator 26 utilizes micropower CMOS analog and digital circuits to achieve a battery current drain of 8 to 23 µA for an $f_{PLL}$ frequency range of 100 to 500 kHz.

Figures 9D, 10D:
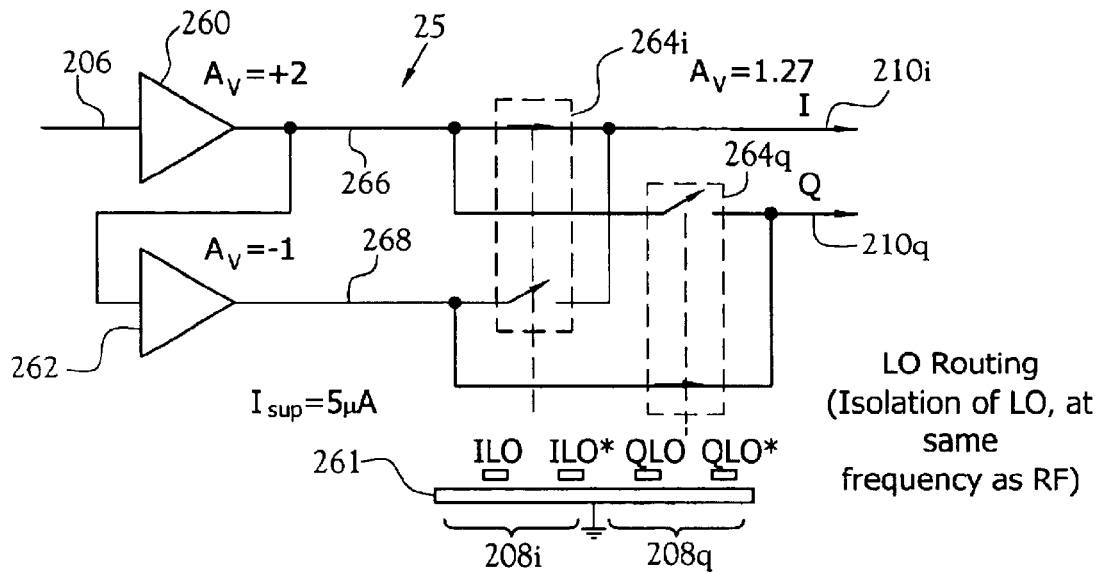
FIG. 9d is a block diagram of a quadrature mixer circuit.
FIG. 10d is a truth table for valid data and noisy data.

The BPSK modulated RF preamplifier output signal 206 is downconverted to baseband using a dual-channel CMOS switching mixer 25 as revealed in FIG. 9d. The RF signal 206 is buffered with a 2× voltage gain 260 to produce a non-inverted RF signal 266 which is also applied to an inverting buffer 262 to produce an inverted RF signal path 268. The non-inverted RF signal 266 and inverted RF signal 268 are alternately commutated by the switches 264$i$ at the $f_{LO}$ rate to produce chopped output signal 210$i$. The chopped output signal 210$i$ thus produced is equivalent to the multiplication of the RF signal by a squarewave at the LO frequency. The signal multiplication generates the desired I baseband difference component corresponding to the BPSK modulation together with the undesired sum frequency component. Similarly, the chopped output signal 210$q$ containing the desired Q baseband component corresponding to the BPSK modulation is produced by commutating the non-inverted signal 266 and inverted signal 268 by switches 264$q$ driven with $f_{LO}$ signals 208$q$ which are in phase quadrature with $f_{LO}$ signals 208$i$. The downconversion mixers 25 utilizes analog and digital CMOS micropower circuits requiring a total battery current of only 5 µA and incorporating differential circuit methods to achieve power supply rejection as required to avoid conversion gain variations due to normal changes in the battery power supply voltage over the useful life of the battery 204. The differential local oscillator signal lines 208 are routed in metal 2 traces positioned over a metallic ground plane 261 implemented in metal 1 for the purpose of reducing parasitic coupling of the LO signals to the preamplifier input via the integrated circuit substrate or by electromagnetic coupling.

Figure 9E:
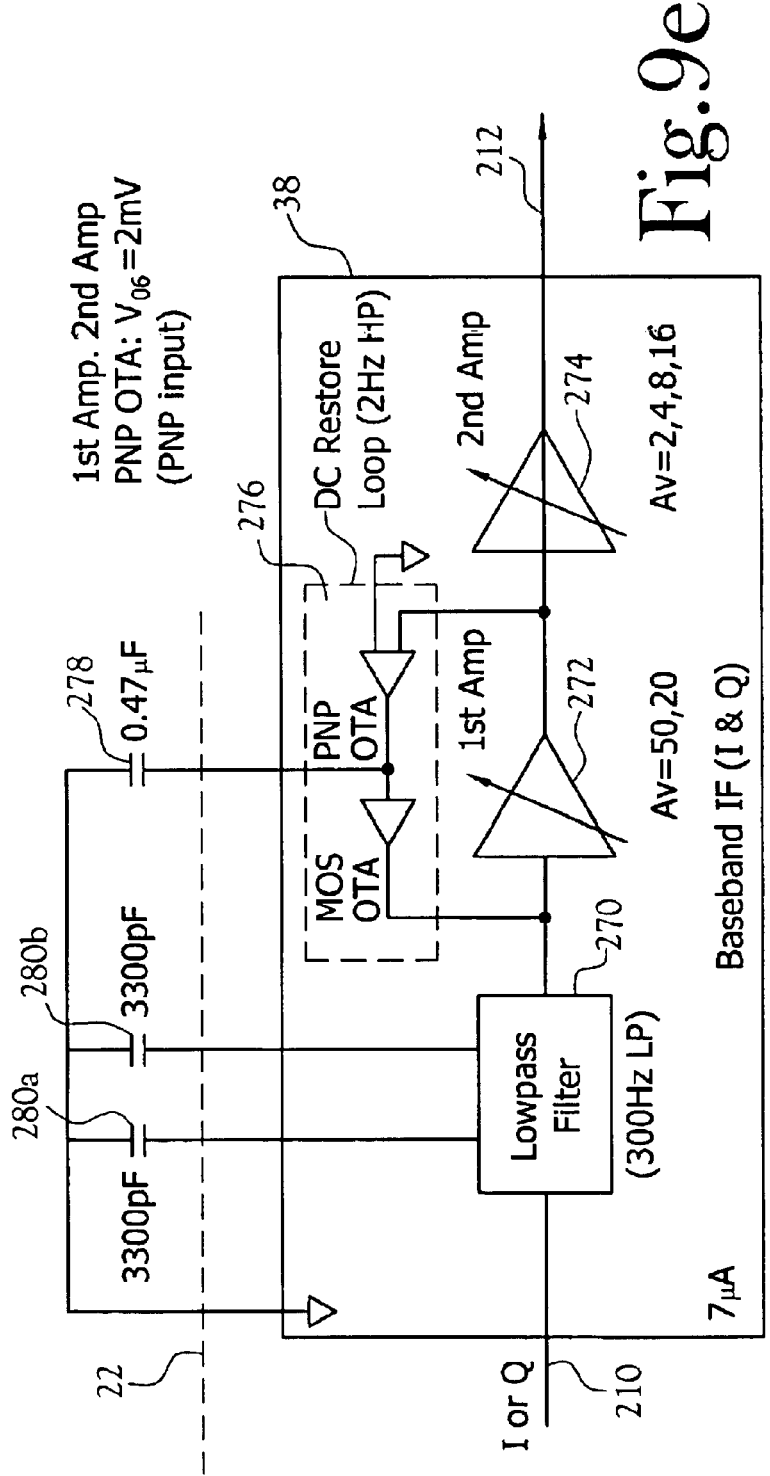
FIG. 9e is a block diagram of the baseband gain and filtering circuits.

The undesired sum signals and other out-of-band signals and noise components are removed from the chopped mixer output signals 210 by use of a dual-channel baseband filtering and amplifier circuits 38, as illustrated in FIG. 9e. The baseband filter and amplifier circuits 38 are comprised of a second order low-pass filter 270 containing two passive RC networks, each with a series 160 kΩ n-well resistor connected to 3300 pF off-chip capacitors 280 to produce a 300 Hz low-pass cutoff frequency. A unity gain CMOS operational amp circuit buffers the output of the first filter from the second filter. The low-pass filter 270 is followed by a first gain stage 272 and then a second gain stage 274. In one embodiment, the voltage gain of the first gain stage 272 is pin-programmable for gains of 20 or 50 and the voltage gain of the second gain stage 274 is pin-programmable for gains of 2, 4, 8, or 16 using pin-programming means similar to the switches 248 in FIG. 9c. The output of the first gain stage 272 connects to a continuous-time baseline restorer circuit 276, which holds the dc level of the first gain state output to within a few millivolts of the desired output dc level, approximately ½ of the available battery voltage. This dc feedback circuit 276 acts as a high-pass filter with a −3 dB cutoff frequency of 2 Hz for an off-chip compensation capacitor 278 of 0.47 µF. The reduced dc offset achieved by using lateral PNP bipolar transistors for the input stage of the second gain stage 274 eliminates the need for a second dc restoration loop to correct the second gain stage 274. The dual baseband filtering and amplifier circuits 38 utilize analog and digital CMOS micropower circuits requiring a total battery current of 19 µA and incorporating differential circuit methods to achieve power supply rejection as required to avoid baseband gain variations due to normal changes in the battery power supply voltage over the useful life of the battery 204.

Figure 9F:
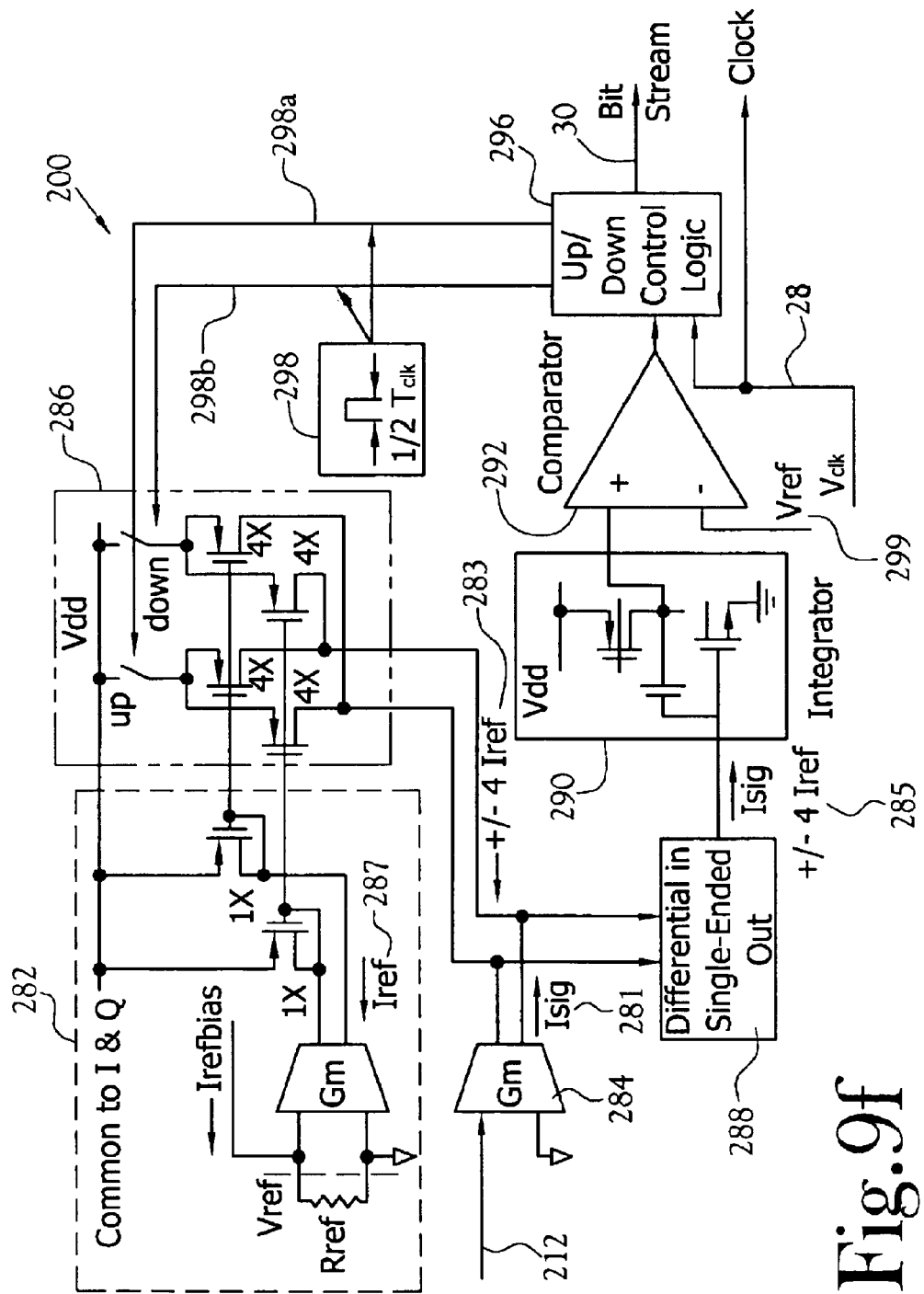
FIG. 9f is a block diagram of the first order sigma delta modulator circuits.

The filtered I and Q baseband signals 212 are integrated in continuous time fashion and quantized into density-of-pulses (DOP) bit streams 30 using a dual-channel sigma delta first order modulator 13 as shown in FIG. 9f. A linear CMOS signal path transconductor 284 converts the baseband signals 212 to differential current signals 281 that are combined with a switched differential feedback current signal 283 supplied by the reversible positive-channel metal oxide semiconductor (PMOS) current mirror 286. The combined differential current signals 281 and 283 are then converted to a composite single-ended current signal 285, which is continuously integrated by an integrator 290. The integrator output is monitored by a CMOS comparator 292 which acts in combination with an up/down control logic 296 to provide proper feedback control 298 to the reversible current mirror 286. The feedback control lines 298 clock the reversible current mirror 286 at the master clock rate 28 such that the differential feedback current 283 is also clocked at the master clock rate 28 and has a 1:1 "on" to "off" ratio or a duty cycle of 50%. The polarity of the clocked feedback current 283 produced by the reversible current mirror 286 is determined by whether control line 298a or 298b is active, the selection of which depends on whether the integrator output is above or below the input-referred comparator threshold level 299. The feedback control is arranged such that the clocked feedback current results in a negative-going integrator output for any clock cycle starting when the integrator output is above the reference threshold level 299 or a positive-going output for any clock cycle starting when the integrator output is below the reference threshold level 299. This keeps the integrator output level within a certain error band of the reference threshold level 299 and, therefore, results in zero net integrator input current 285 on average. This implies zero average net charge transfer to the integrator 290 on average, which implies that the time integral of the feedback current 283 is in balance with the time integral of the signal current 281 on average. The feedback current 283 is a 4× multiple of the differential reference current signal 287 produced by reference transconductor 282. The reference input voltage for the reference transconductor 282 is set by an off-chip resistor to allow external adjustment of the conversion gain of the sigma delta modulator 13. The reference transconductor 282 is a replicated copy of the signal transconductor 284 to render the overall modulator conversion gain of the sigma delta modulator 13 insensitive to transconductance variations caused by integrated circuit processing variations or variations in operating temperature. Because a fixed feedback charge is either removed or added to the integrator for each clock cycle, the time integral of the feedback current 283 and, therefore, the time integral of the signal current 281 is measured digitally by appropriately counting the bit streams 30. The up/down logic 296 configures the output bit streams 30 to contain a logic zero for each clock cycle corresponding to a positive value of the feedback current 283 and a logic one for each clock cycle corresponding to a negative value of the feedback current 283. The dual-channel sigma delta first order modulator 200 utilizes micropower analog and digital CMOS circuits requiring a total battery current of 19 $\mu$A and incorporating differential circuit methods to achieve power supply rejection as required to avoid modulator conversion variations due to normal changes in the battery power supply voltage over the useful life of the battery 204.

The receiver IC 22 optionally includes dual baseline crossing detectors 29 for detecting every instance of baseline crossing of the I and Q baseband signals 212. The baseline crossing detector 29i produces at its output 31i, a countable logic pulse for each instance of baseline crossing of the I baseband signal 212i. Similarly, the baseline crossing detector 29q produces at its output 31q, a countable logic pulse for each instance of baseline crossing of the Q baseband signal 212q. The baseline crossing detectors 29 are implemented using voltage comparator circuits with latchable outputs such that the comparator outputs 31 can be clamped high for a fixed deadtime of nominally 1 millisecond immediately following a detected baseline crossing. The fixed deadtime acts to limit the maximum output pulse count rate and prevent a high power consumption that might otherwise occur when detecting very noisy signals having many baseline crossings. The fixed deadtime also prevents multiple pulsing at the outputs 31 that may otherwise occur when using low-hysteresis comparators to detect relatively slow threshold crossings of a noisy signal. In one embodiment, the nominal 1 millisecond deadtime is generated using a presettable digital counter to count the master clock 28 for 32 clock cycles. The dual baseline crossing detectors 29 utilizes micropower analog and digital CMOS circuits requiring a total battery current of 5 $\mu$A and incorporates differential circuit methods to achieve power supply rejection as required to avoid performance degradation due to normal changes in the battery power supply voltage over the useful life of the battery 204.

Figure 10A:
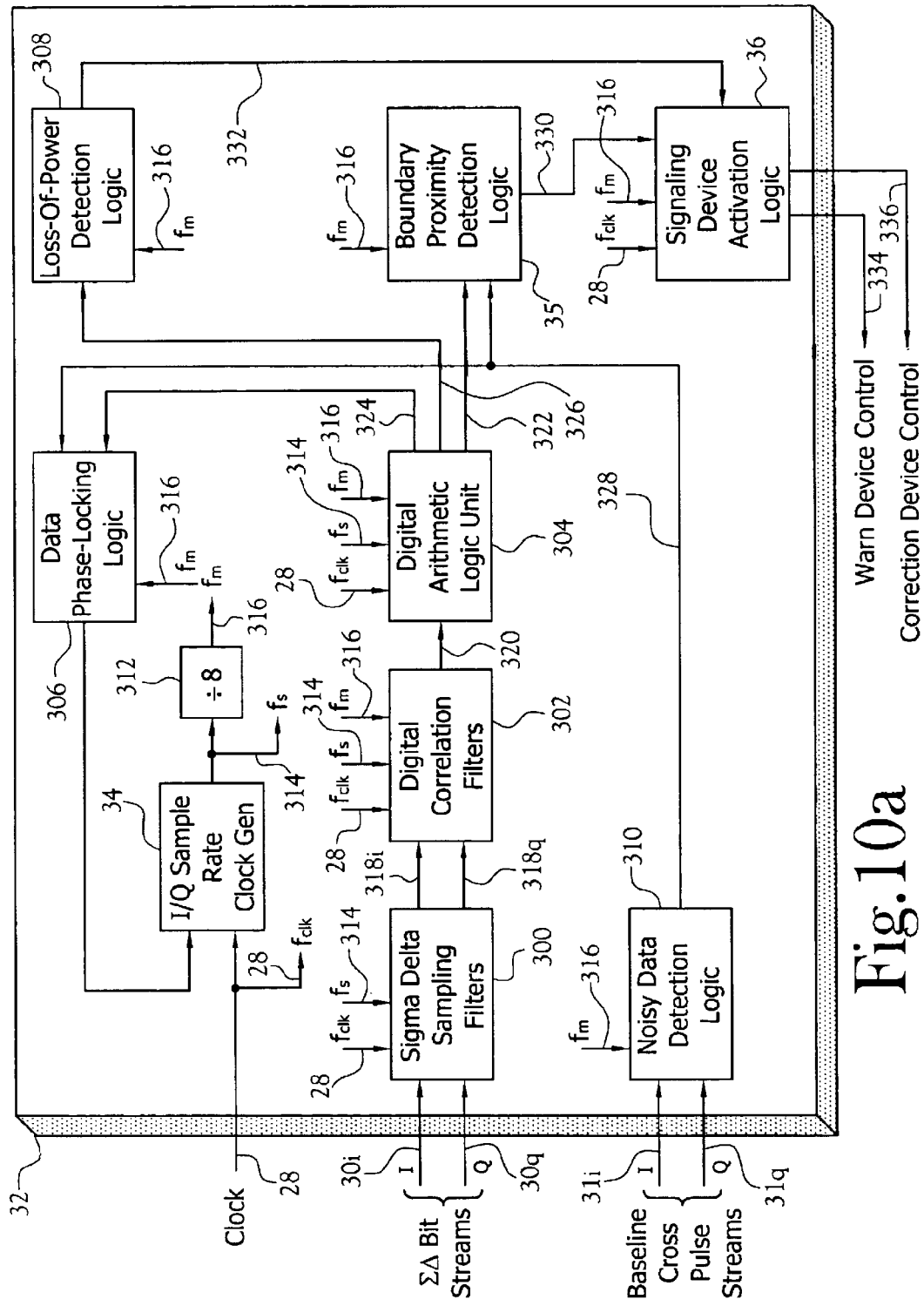
FIG. 10a is a block diagram of a digital data acquisition and processing circuit.
Figure 10B:
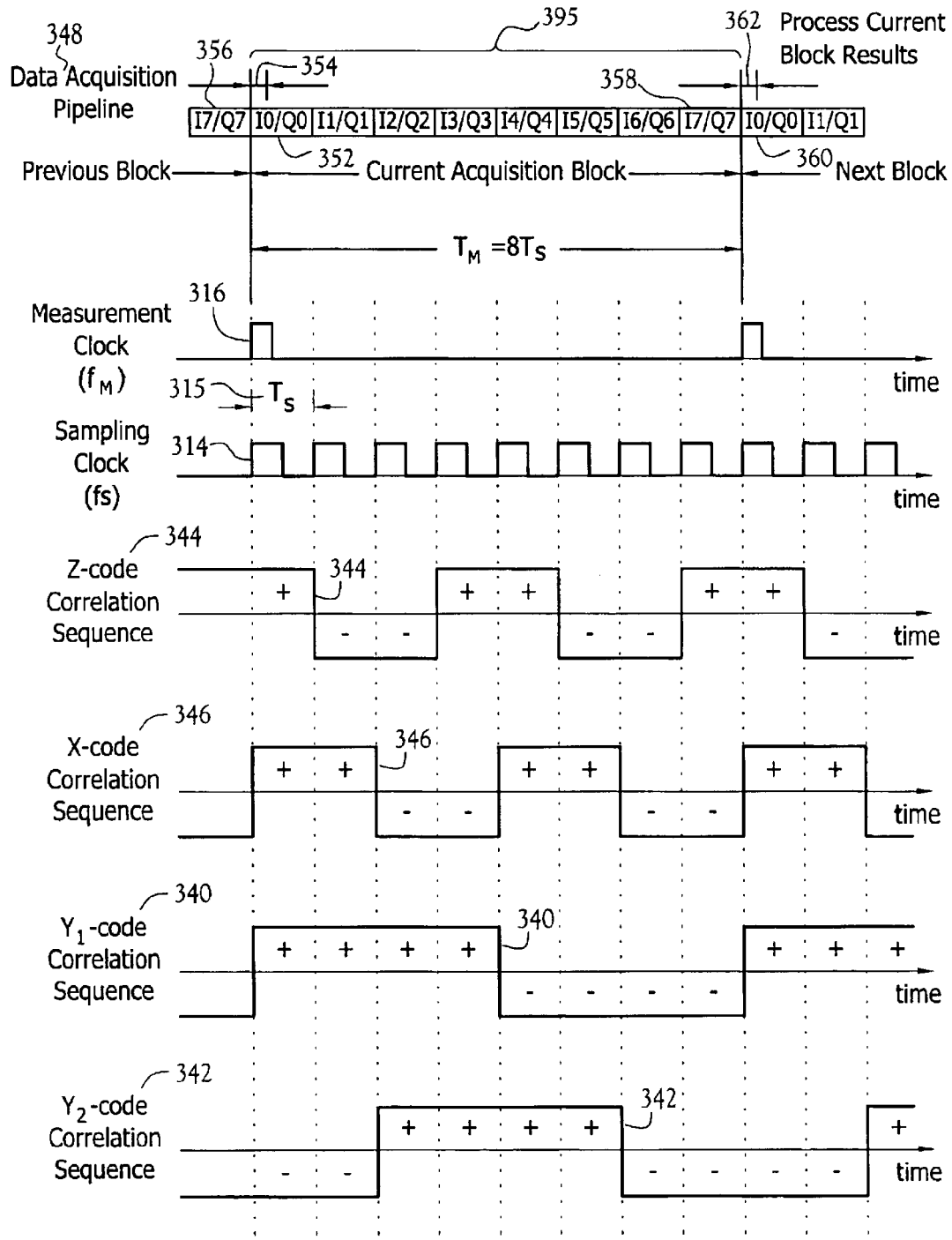
FIG. 10b is a timing diagram showing selected correlation sequences for an embodiment of a digital processing circuit.
Figure 10C:
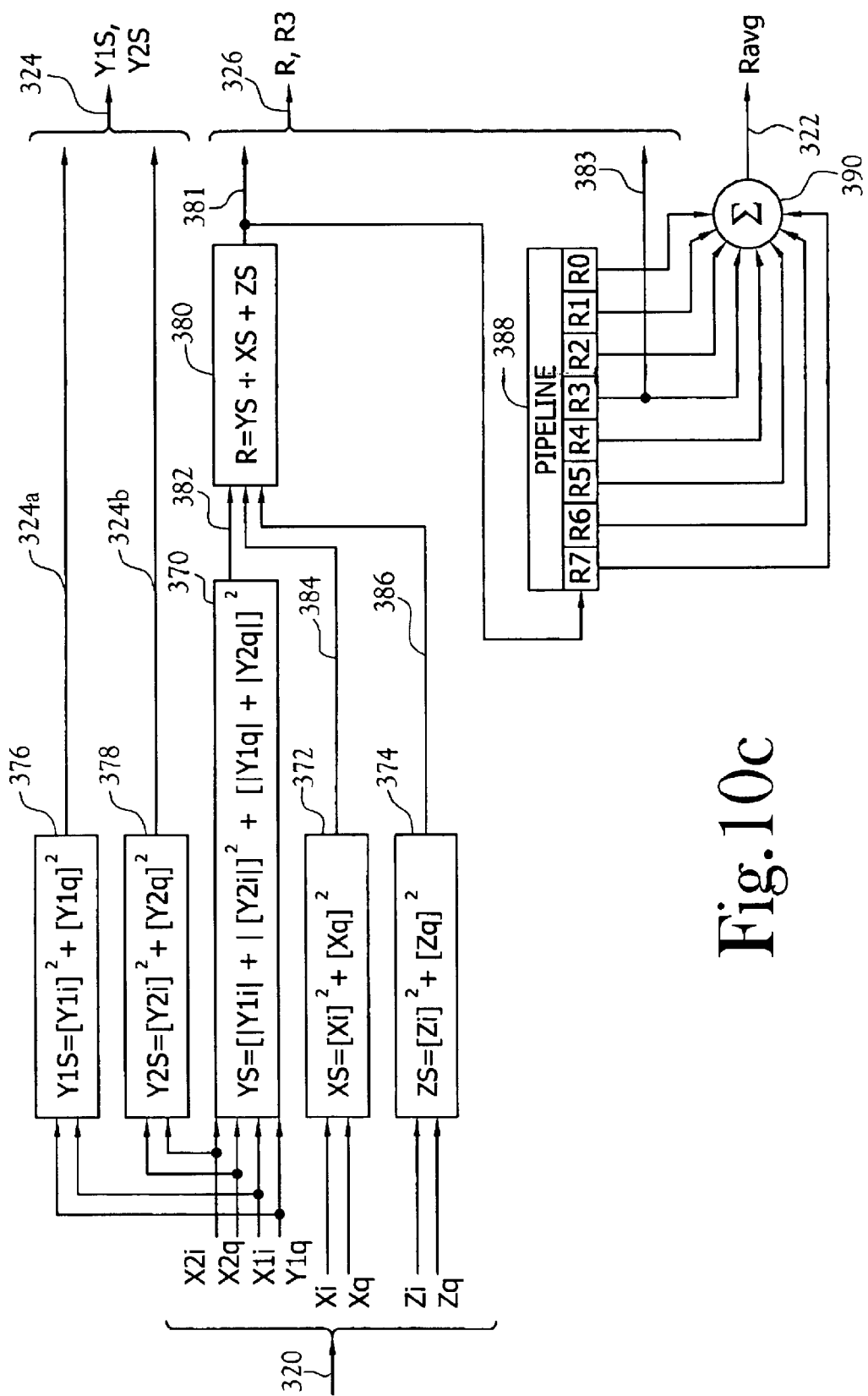
FIG. 10c is a block diagram showing the algorithms for an embodiment of a digital processing circuit.

With reference to collective FIG. 10, one embodiment for the receiver module 11 uses a digital CMOS integrated circuit 32 for digital data acquisition and processing as illustrated in FIG. 10a, a correlation means for extracting magnetic field component measures from the I and Q data samples using the correlation sequences described in FIG. 10b, an arithmetic logic unit (ALU) to digitally compute magnetic field component power and total power measures according to the method revealed in FIG. 10c, and a means for data-based correlator phase locking using the logic summarized in the truth table of FIG. 10d. Signed 8-bit data 318 representative of the time integration of the filtered I and Q baseband signals 212 is produced by dual sigma delta sampling filters 300 which count the sigma delta bit streams 30 under control of the master system clock, $f_{CLK}$, 28 (nominally 32,760 Hz) and the sampling clock, $f_S$, 314 generated by the I/Q sample rate generator 34. The sigma delta sampling filters 300 incorporate digital up-down counters which count up on $f_{CLK}$ clock 28 if the bit stream 30 is a logic "one" and count down on $f_{CLK}$ clock 28 if the bit stream is a logic "zero". Signed 8-bit values in the up-down counters are then read out as digital samples 318 representative of the I and Q baseband signals continuously integrated by the sigma delta modulators 200 over a time equivalent to one period of the $f_S$ clock 314. Thus, the up-down counters forming the sigma delta sampling filters 300 are repetitively read out and reset at the $f_S$ clock rate. The $f_S$ sampling clock 314 is produced by an I/Q sample rate generator 34 incorporating a frequency divider which divides the system clock 28 by integer divisor $N_{DIV}$. The average value of $N_{DIV}$ is selected to provide an average $f_S$ clock frequency 314 equal to 2× the local power line frequency. Also, the value of $N_{DIV}$ (and indirectly the value of $f_S$) are "dithered" under control of data phase locking logic 306. The $f_S$ sampling clock 314 is further divided by a conventional divide by 8 binary counter 312 to produce the measurement rate clock, $f_M$, 316. The average $f_M$ clock 316 frequency is thus regulated to be ¼ the power line frequency or the average period of the $f_M$ clock 316 is regulated to be nominally the same as the period 74 of the transmitter first modulation signal 57.

The receiver module digital IC 32 includes noisy data detection logic 310 for determining if the data acquired over an $f_M$ clock cycle should be flagged as valid data or invalid, noisy data based on the number of I or Q baseline crossings as detected by the baseline crossing detectors 29. The noisy data detection logic 310 includes dual digital counters configured to count the I and Q cross count bit streams 31 for one period of the $f_M$ clock and digital logic to compare each count to an internally stored fixed digital parameter, GOODTHLD. The comparison logic is configured to produce a true good data 1-bit status flag 328 if either the I or Q baseline counts over one $f_M$ period does not exceed GOODTHLD. A typical value of 10 is used for the GOODTHLD parameter, in one embodiment.

The receiver module digital IC 32 includes digital correlation filters 302 for correlating the I and Q sampled data 318 to extract sets of sample measures 320 of the portions of the I and Q received signals resulting from the magnetic field intensity components broadcast by the transmitter first, second and third antennas 43, 44 and 45. A set of first measures, Y1i and Y1q corresponding to the content of the I and Q samples 318 associated with the magnetic field intensity component broadcast by the transmitter first antenna 43 are obtained by cross-correlating the I and Q samples 318 with the Y1 code correlation waveform 340 of FIG. 10b. This is implemented in the digital correlation filters 302 by digitally cross-correlating of 8 successive sets of the I and Q digital sample representations 318 with the sequence {+1, +1, +1, +1, −1, −1, −1, −1}. Similarly, a set of second measures, Y2i and Y2q, which are associated with the magnetic field intensity component broadcast by the transmitter first antenna 43 are obtained by cross-correlating the I and Q samples 318 with the Y2 code correlation waveform 342 in FIG. 10b. This is implemented in the digital correlation filters 302 by digitally cross-correlating 8 successive sets of the I and Q digital sample representations 318 with the sequence {−1, −1, +1, +1, +1, +1, −1, −1}. Similarly, a set of measures Zi and Zq, which correspond to the content of the I and Q samples 318 associated with the magnetic field intensity component broadcast by the transmitter second antenna 44 are obtained by cross-correlating the I and Q samples with the Zcode correlation waveform 344 of FIG. 10b. This is implemented in the digital correlation filters 302 by digitally cross-correlating 8 successive sets of the I and Q digital sample representations 318 with the sequence {−1, −1, +1, +1, +1, +1, −1, −1}. Similarly, a set of measures Xi and Xq corresponding to the content of the I and Q samples 318 associated with the magnetic field intensity component broadcast by the transmitter third antenna 45 are obtained by cross-correlating the I and Q samples with the Xcode correlation waveform 346 of FIG. 10b. This is implemented in the digital correlation filters 302 by digitally cross-correlating 8 successive sets of the I and Q digital sample representations 318 with the sequence {+1, +1, −1, −1, +1, +1, −1, −1}. The 8 successive sets of the I and Q digital samples 318 used for all the indicated digital correlation operations represent the I and Q samples acquired over one period, $T_M$, of the $f_M$ measurement rate clock 316 as indicated by FIG. 10b. Therefore, on average the correlations are also performed over nominally one complete cycle 74 of the transmitter first modulation signal 57, and over two complete cycles of the transmitter second and third modulation signals 58 and 59. In one embodiment, the digital correlation filters 302 implement the indicated correlations by digital processing means wherein each of the 8 successive I and Q samples is either added or subtracted from a digital accumulator in accordance with the indicated correlation sequences. This method requires that each I or Q data sample be accumulated only once per measurement cycle, being therefore implementable with simpler and more compact digital processing logic compared to prior art correlator methods based on multi-tap digital transversal filters involving a multiplicity of accumulation operations for each data sample corresponding to the multiplicity of transversal filter taps. Because the successive samples are accumulated at the $f_S$ clock 314 rate, the correlation results for any particular $f_M$ clock period, shown as I0/Q0–I7/Q7 in the data acquisition pipeline 348 of FIG. 10b, are complete at the end of the $f_M$ period after the I7/Q7 sample set 358 is correlated. The correlation results are then passed to the ALU 304 for additional processing at the $f_M$ rate 316 beginning during the first $f_S$ clock cycle of the next $f_M$ clock data correlation period. In one embodiment, the correlation results 320 are unsigned 8-bit binary values. No sign bit is necessary because all subsequent processing of the correlation results 320 involve only squaring operations or addition of absolute values.

The receiver module digital IC 32 includes a digital arithmetic logic unit 304 for digital arithmetic computations on the I and Q correlation results to obtain first, second and third power measures corresponding to those portions of the received signal power arising respectively from magnetic field power components broadcast by the transmitter first, second and third antennas 43, 44 and 45, the relative magnitudes of said power measures being dependent on the orientation of the receiver module sensing antenna 21 relative to the direction vector of the incident field. The digital arithmetic logic unit 304 provides for digitally summing the first, second and third power measures to obtain a digital measure, R or $R_{AVG}$, of the total magnetic field power incident on the receiver module 11, said total power measure being independent of the orientation of the receiver module sensing antenna 21 and therefore useful for accurate and robust wireless boundary proximity detection. The arithmetic logic unit 304 processes the indicated correlation results 320 according to the arithmetic formula 370 of FIG. 10c to produce an accurate first measure, YS, 382 of that portion of the received signal power arising from the magnetic field power broadcast by the transmitter first antenna 43. The arithmetic logic unit 304 also processes the indicated correlation results 320 according to the arithmetic formula 374 of FIG. 10c to produce an accurate second measure, ZS, 386 of that portion of the received signal power arising from the magnetic field power broadcast by the transmitter second antenna 44. The arithmetic logic unit 304 also processes the indicated correlation results 320 according to the arithmetic formula 372 of FIG. 10c to produce an accurate third measure, XS, 384 of that portion of the received signal power arising from the magnetic field power broadcast by the transmitter third antenna 45. The digital arithmetic logic unit 304 is implemented with a 12-bit architecture and include logic for binary number addition, rotation and truncation. The squaring operations indicated in FIG. 10c are implemented with the Booth procedure for binary number multiplication. The 16-bit multiplication results are truncated back to 8-bits for further processing operations.

The measures XS 384 and ZS 386 represent accurate power measures only if the receiver module $f_M$ measurement clock 316 is locked in close phase alignment with the transmitter third modulation signal 59. However, the power measure YS 382 is accurate irrespective of the phase relationship between the receiver module acquisition and measurement clock, $f_M$ 316 and transmitter modulation signals. The digital arithmetic logic unit 304 also processes the indicated correlation results 320 according to the arithmetic formula 376 of FIG. 10c to produce a first pseudo power measure, Y1S 324a and for processing the indicated correlation results 320 according to the arithmetic formula 378 of FIG. 10c to produce a second pseudo power measure, Y2S 324b. The pseudo power measures 324a and 324b have variable magnitude as a function of the phase of the receiver module $f_M$ clock relative to the phase of the transmitter first modulation signal 57, however the variation of measure 324a is in quadrature relationship with the variation of measure 324b. Moreover, the magnitudes are equal when the phase of the $f_M$ clock 316 is aligned with the phase of the transmitter third modulation signal 59 as desired to guarantee the accuracy of power measures 384 and 386 as previously described. Moreover any shift away from this desired phase lock relationship produces an increase in the magnitude of the 324a pseudo power measure and a decrease in the magnitude of the 324b pseudo power measure or vice versa. The magnitude difference between the pseudo power measures 324a and 324b is therefore useful for application as an error signal in a dithering feedback means of maintaining the desired phase lock between receiver module $f_M$ clock 316 and transmitter third modulation signal 59. The frequency of the $f_S$ sampling clock 314 is dithered by dithering the $N_{DIV}$ ratio used by the I/Q sample rate generator 34 to produce the $f_S$ clock. As previously discussed, the $f_S$ clock is desired to be nominally 2× the power line frequency so that the fit clock is ¼ the power line frequency to be in agreement with the frequency of the transmitter first modulation signal 57. If Y2S<Y1S as detected by the data phase locking logic 306, then $N_{DIV}$ is set to provide an $f_S$ slightly less than twice the power line frequency. If the data phase locking logic 306 determines that Y2S< or=Y1S, then $N_{DIV}$ is set to provide an $f_S$ slightly greater than twice the power line frequency. If the noisy data detection logic 310 determines that the Y1S and Y2S measures 324 are based on noisy and potentially invalid data, then $N_{DIV}$ is not dithered, but is held at the nominal settings. The dithering data phase lock process uses the $N_{DIV}$ values as revealed in the truth table 400 of FIG. 10d and is effective to acquire the desired data phase locking in about 1 second and to maintain robust locking properties under poor signal-to-noise ratio conditions. To ensure that all 8 sets of I/Q data samples 355 used in a given correlation operation are acquired with the same sampling time 315, the value of $N_{DIV}$ must be dithered sometime 354 or 362 before the completion of the sample period corresponding to the acquisition of the first data set I0/Q0 352 or 358. This means that the arithmetic logic unit 304 must complete the calculation of the pseudo power measures 324 in less than 8.33 milliseconds (for the case of 60 Hz line power frequency) which corresponds to about 273 cycles of the 32,760 Hz system clock 28. This is achieved using a Booth multiplication procedure that requires only 10 clock cycles for multiplication of 8-bit numbers. Those skilled in the art will recognize other multiplication methods which can be used.

The digital arithmetic logic unit 304 provides digital means 380 for summing the first, second and third power measures 382, 384 and 386 to obtain a digital measure, R, 381 representative of the total magnetic field signal power incident on the receiver module 11. The total power measure 381 is substantially independent of the orientation of the receiver module sensing antenna 21 and therefore useful for accurate and robust wireless boundary proximity detection. The noise-related uncertainty in the total power measure sample values 381 is optionally reduced by additional digital filtering to obtain a more accurate measure of the total magnetic field signal power. This additional digital filter is implemented in the form of a uniformly weighted, 8-tap moving average filter wherein 8 successive R values are stored in data pipeline 388 and all 8 values are summed in an accumulator 390 to provide the more accurate sample measure, $R_{AVG}$ 322. The arithmetic logic unit 304 is configured to monitor the noisy data status flag 328 and load new R values 381 into the digital filter pipeline 388 only if the flag 328 is set to indicate valid data.

The receiver module digital IC 32 includes boundary proximity detection logic 35 which compares the value of the orientation-independent total power measure, $R_{AVG}$, 322 to the value of an internally stored, preselected fixed digital parameter, RTHLD. A wireless boundary encompassing and referenced to the position of the transmitter 10 is defined to be the locus of all points on a path surrounding the transmitter for which the receiver module computed total power measure 322 is equal to the fixed RTHLD reference value. The value used for the fixed parameter RTHLD should be far enough above the noise floor of the $R_{AVG}$ data 322 to provide for an acceptable signal-to-noise ratio and boundary proximity detection repeatability when the value of $R_{AVG}$ approaches the value of RTHLD. For pet containment applications, RTHLD should be at least four times greater than the noise floor of the $R_{AVG}$ signal. By comparing the computed power measure sample values 322 to RTHLD, the boundary proximity detection logic 35 unambiguously detects when the receiver module 11 becomes proximate to the wireless boundary and whether the boundary is approached from the inside or from the outside. The boundary detection logic 35 provides at least one logic control signal 330 to the device activation logic 32 as required to activate a signaling device or devices 37 when, as in a pet containment application, the receiver module 11 approaches the wireless boundary from the inside as indicated by the detection of $R_{AVG}$<RTHLD for one or more consecutive measurement cycles. Alternately, the boundary detection logic 35 may act to provide logic control signal or signals 330 to the signaling device activation logic 36 as required to activate a signaling device or devices 37 when, as in a kiosk or collision avoidance application, the receiver module 11 approaches the wireless boundary from the outside as indicated by the detection of $R_{AVG}$>RTHLD for one or more consecutive measurement cycles. For pet containment applications, the boundary control logic 35 compares the total power measure 322 to two different fixed threshold levels for the purpose of defining a wireless warning boundary for warning the pet 39 before it reaches the primary containment boundary which the pet 39 has been trained to associate with negative correction stimulus such as a mild shock. Depending on the application, the signaling device activation logic 36 activates the signaling device or devices 37 including one or more of a sonic (audible by humans and pets) sound emitter, an ultrasonic sound emitter, a visible light emitter, high voltage pulses via exposed electrodes, emitter of chemical vapor, aerosol or spray, RF signal transmitter, or mechanical vibration emitter.

In those applications, such as pet containment, where the boundary detection logic 35 and device activation logic 330 are configured to activate a signaling device or devices 37 when the receiver module 11 and pet 39 approach the wireless boundary from the inside, a false alarm condition can occur when the $R_{AVG}$ data measure suddenly drops below RTHLD due to a sudden loss-of-power to the transmitter 10. For these applications, the receiver module digital IC 32 includes a loss-of-power detection logic circuit 308, which compares the current total power measure, R, 381 with one of the earlier R values as stored in the R0-R7 data pipeline 388, and sets a 1-bit loss-of-power status flag 332 if the selected previous R value exceeds the current R value by more than the value of an internally stored, preselected fixed parameter RDELTA for one or more consecutive measurement cycles. The signaling device activation logic 36 is configured to not activate the signaling devices 37 if the status flag 332 is set to indicate a transmitter loss-of-power condition. The loss-of-power status bit also activates a master reset of the entire receiver module digital IC 32. For pet containment applications, the previous R value used by the loss-of-power detection logic 308 is the R3 sample 383, and the value of RDELTA is typically in the range of 1 to 1.5 times the value of the RTHLD parameter.

According a wireless pet containment system has been shown and described. Those skilled in the art will recognize that the embodiments of the wireless pet containment system described herein can be varied without departing from the spirit and scope of the present invention. For example, where component values are referenced, those values are intended to be representative of one embodiment of the wireless pet containment system according to the present invention and not a limitation on acceptable component values. Further, while a number of components are described as being combined in a single integrated circuit, those skilled in the art will recognize that the functions included on the integrated circuit can be realized in other implementations, for example, using discrete components. While sacrificing small size, other implementations are acceptable alternatives where size and power consumption are not primary considerations.

While several embodiments have been shown and described, it will be understood that it is not intended to limit the disclosure, but rather it is intended to cover all modifications and alternate methods falling within the spirit and the scope of the invention as defined in the appended claims.

Having thus described the aforementioned invention, we claim:

1. A proximity monitoring system capable of accurate boundary detection that is substantially independent of orientation, said proximity monitoring system comprising:
   a transmitter including at least one antenna array, said transmitter generating an electrical signal, said transmitter antenna array continuously generating a magnetic field based on said electrical signal, said magnetic field having an intensity and defining a boundary, said transmitter connected to a power supply line having a frequency; and
   a receiver module including an antenna array responsive to said magnetic field in electrical communication with a receiver, a measurement circuit for determining a total power of said magnetic field incident at said antenna array, and a digital signal processor for extracting components of said magnetic field and rejecting interference induced from said power supply line frequency.

2. A proximity monitoring system capable of accurate boundary detection that is substantially independent of orientation, said proximity monitoring system comprising:
   a transmitter including at least one antenna array, said transmitter generating an electrical signal, said transmitter antenna array continuously generating a magnetic field based on said electrical signal, said magnetic field having an intensity and defining a boundary; said transmitter at least one antenna array includes a first transmitter antenna representing a first coordinate axis, a second transmitter antenna representing a second coordinate axis, and a third transmitter antenna representing a third coordinate axis; and
   a receiver module including an antenna array responsive to said magnetic field in electrical communication with a single channel receiver and a measurement circuit for determining a total power of said magnetic field incident at said antenna array.

3. The proximity monitoring system of claim 2 wherein said magnetic field is a composite magnetic field summing a first magnetic field component from said first transmitter antenna, a second magnetic field component from said second transmitter antenna, and a third magnetic field component from said third transmitter antenna.

4. The proximity monitoring system of claim 3 wherein each of said first magnetic field component, said second magnetic field component, and said third magnetic field component is continuously transmitted using a single carrier frequency.

5. The proximity monitoring system of claim 4 wherein said single carrier frequency is uniquely modulated for each of said first magnetic field component, said second magnetic field component, and said third magnetic field component.

6. The proximity monitoring system of claim 4 wherein said single carrier frequency is a programmable integral multiple of a power supply line frequency.

7. The proximity monitoring system of claim 4 wherein said single carrier frequency is derived from a crystal oscillator using a phase locked loop.

8. The proximity monitoring system of claim 4 wherein said single carrier signal is modulated using a binary phase shift keying waveform.

9. The proximity monitoring system of claim 8 wherein a coherent said binary phase shift keying waveform is modulated using a waveform produced by integral ratio frequency division of a transmitter system clock.

10. The proximity monitoring system of claim 8 wherein said binary phase shift keying waveform is selected to produce a high degree of rejection of interference at a power line frequency and any significant harmonics of the power line frequency and to allow accurate decomposition of said composite magnetic field into said first magnetic field component, said second magnetic field component, and said third magnetic field component.

11. The proximity monitoring system of claim 2 wherein said first transmitter antenna, said second transmitter antenna, and said transmitter third antenna are constructed using antenna coils having substantially similar dimensions.

12. The proximity monitoring system of claim 2 wherein one of said first transmitter antenna, said second transmitter antenna, and said transmitter third antenna is constructed from a pair of said antenna coils.

13. A proximity monitoring system capable of accurate boundary detection that is substantially independent of orientation, said proximity monitoring system comprising:
   a transmitter including at least one antenna array, said transmitter generating an electrical signal, said transmitter antenna array continuously generating a magnetic field based on said electrical signal, said magnetic field having an intensity and defining a boundary; and
   a receiver module including an antenna array responsive to said magnetic field in electrical communication with a single channel receiver and a measurement circuit for determining a total power of said magnetic field incident at said antenna array, said receiver antenna array includes a two-axis, single output magnetic field sensing antenna producing a single magnetic field transduction signal output.

14. The proximity monitoring system of claim 13 wherein said receiver is fabricated on a single integrated circuit including an input amplifier, an I and Q baseband converter, a phase locked loop, a crystal oscillator, a baseband pass filter, and an I and Q baseband amplifier.

15. The proximity monitoring system of claim 14 wherein said receiver further includes a baseband sigma delta modulator for producing an I and Q bit stream.

16. The proximity monitoring system of claim 15 wherein said receiver further includes a sigma delta converter digital filter for sampling said I and Q bit stream down to a sampling frequency that is nominally equivalent to twice a power line frequency.

17. The proximity monitoring system of claim 14 wherein said I and Q baseband converter is a switching mixer.

18. The proximity monitoring system of claim 14 wherein said receiver further includes an analog-to-digital converter in electrical communication with said I and Q baseband converter, said receiver module further comprising a digital signal processor in electrical communication with said analog-to-digital converter, said analog-to-digital converter producing an digital I and Q baseband signal from an output of said I and Q baseband converter.

19. The proximity monitoring system of claim 18 wherein said digital signal processor extracts each of said first magnetic field component, a second magnetic field component, and a third magnetic field component from said digital I and Q baseband signal.

20. The proximity monitoring system of claim 19 wherein said receiver module is carried by a pet, said receiver module further comprising a stimulus delivery system for applying a deterrent stimulus to the pet when the pet approaches said boundary.

21. The proximity monitoring system of claim 14 wherein said receiver includes detection logic to detect an unusually rapid decrease in said total power of said magnetic field incident at said antenna array thereby indicating a loss of power to said transmitter.

* * * * *